United States Patent
Duncan et al.

(10) Patent No.: US 11,872,476 B2
(45) Date of Patent: Jan. 16, 2024

(54) INPUT DEVICE FOR AN ELECTRONIC SYSTEM

(71) Applicant: GOOGLE LLC, Mountain View, CA (US)

(72) Inventors: Scott K. Duncan, Sunnyvale, CA (US); Livius Chebeleu, San Jose, CA (US); Alexander Wroblewski, Santa Clara, CA (US)

(73) Assignee: GOOGLE LLC, Mountain View, CA (US)

( * ) Notice: Subject to any disclaimer, the term of this patent is extended or adjusted under 35 U.S.C. 154(b) by 750 days.

(21) Appl. No.: 16/971,076

(22) PCT Filed: Apr. 2, 2019

(86) PCT No.: PCT/US2019/025400
§ 371 (c)(1),
(2) Date: Aug. 19, 2020

(87) PCT Pub. No.: WO2019/195300
PCT Pub. Date: Oct. 10, 2019

(65) Prior Publication Data
US 2021/0093950 A1    Apr. 1, 2021

Related U.S. Application Data

(60) Provisional application No. 62/651,542, filed on Apr. 2, 2018, provisional application No. 62/779,794, filed on Dec. 14, 2018.

(30) Foreign Application Priority Data

Mar. 15, 2019   (WO) ................ PCT/US2019/002472

(51) Int. Cl.
*A63F 13/24*   (2014.01)
*A63F 13/90*   (2014.01)
(Continued)

(52) U.S. Cl.
CPC .............. *A63F 13/24* (2014.09); *A44B 1/08* (2013.01); *A63F 13/90* (2014.09); *H01M 50/209* (2021.01)

(58) Field of Classification Search
CPC ............ A63F 13/24; A63F 13/90; A44B 1/08; H01M 50/209; H01H 25/041;
(Continued)

(56) References Cited

U.S. PATENT DOCUMENTS 5,948,559 A   9/1999 Snyder
6,855,058 B2  2/2005 Kubota et al.
(Continued)

FOREIGN PATENT DOCUMENTS

CN   101068258 A   11/2007
CN   103904263 A   7/2014
(Continued)

OTHER PUBLICATIONS

Notice of Allowance dated Jul. 29, 2022 for U.S. Appl. No. 17/123,523, 6 pages.
(Continued)

*Primary Examiner* — Pierre E Elisca

(57) ABSTRACT

A control pad assembly for an input device includes a bracket with a support having a bearing surface, a button cap configured to pivot relative to the bracket, the button cap including a peripheral lip and a pivot member configured to abut against the bearing surface of the support, and a return mechanism configured to bias the button cap towards the bracket. The return mechanism includes a hub portion positioned at least partially between the button cap and the bracket, and at least a first spring having a fixed end connected to the hub portion and a free end that is configured to deflect relative to the fixed end, the free end being coupled to a first portion of the peripheral lip of the button cap.

25 Claims, 24 Drawing Sheets

(51) Int. Cl.
*A44B 1/08* (2006.01)
*H01M 50/209* (2021.01)

(58) Field of Classification Search
CPC ..... Y02E 60/10; G06F 3/0202; G06F 3/0338; G05G 2009/04744; G05G 5/05; G05G 9/047
USPC .......................................................... 463/37
See application file for complete search history.

(56) References Cited

U.S. PATENT DOCUMENTS

| | | | |
|---|---|---|---|
| 7,401,150 B2 | 7/2008 | Shea et al. | |
| 7,774,440 B1 | 8/2010 | Bagrodia | |
| 8,171,145 B2 | 5/2012 | Allen et al. | |
| 8,215,483 B2 | 7/2012 | Wakitani et al. | |
| 8,619,588 B2 | 12/2013 | Karacali-Akyamac | |
| 8,621,585 B2 | 12/2013 | Danieli et al. | |
| 8,641,531 B2 | 2/2014 | Patil | |
| 8,979,647 B2 | 3/2015 | Ostergren et al. | |
| 9,339,733 B2 | 5/2016 | Boudville | |
| 9,393,486 B2 | 7/2016 | George | |
| 9,396,702 B2 | 7/2016 | Colenbrander | |
| 9,498,711 B2 | 11/2016 | Assa | |
| 9,526,989 B2 | 12/2016 | Oh | |
| 9,592,446 B2 | 3/2017 | Bono et al. | |
| 9,675,874 B1 | 6/2017 | Park | |
| 9,912,562 B2 | 3/2018 | Callahan et al. | |
| 10,166,471 B2 | 1/2019 | Vincent et al. | |
| 10,244,765 B2 | 4/2019 | Pierce et al. | |
| 10,255,765 B2 | 4/2019 | Washington et al. | |
| 10,456,672 B2 | 10/2019 | Champy | |
| 11,128,636 B1 | 9/2021 | Jorasch et al. | |
| 2001/0023816 A1 | 9/2001 | Kuriyama | |
| 2004/0198403 A1 | 10/2004 | Pedersen et al. | |
| 2005/0074063 A1 | 4/2005 | Nair et al. | |
| 2006/0154710 A1 | 7/2006 | Serafat | |
| 2006/0287096 A1 | 12/2006 | O'Kelley et al. | |
| 2006/0287099 A1 | 12/2006 | Shaw et al. | |
| 2007/0018980 A1 | 1/2007 | Berteig et al. | |
| 2008/0220878 A1 | 9/2008 | Michaelis | |
| 2009/0008404 A1 | 1/2009 | Kim et al. | |
| 2009/0125961 A1 | 5/2009 | Perlman et al. | |
| 2009/0271656 A1 | 10/2009 | Yokota et al. | |
| 2010/0167809 A1 | 7/2010 | Perlman et al. | |
| 2010/0203952 A1 | 8/2010 | Zalewski | |
| 2010/0306813 A1 | 12/2010 | Perry | |
| 2010/0317443 A1 | 12/2010 | Cook et al. | |
| 2011/0124417 A1 | 5/2011 | Baynes et al. | |
| 2011/0145635 A1 | 6/2011 | Buckler et al. | |
| 2012/0004042 A1 | 1/2012 | Perry et al. | |
| 2012/0079080 A1 | 3/2012 | Pishevar | |
| 2012/0209571 A1 | 8/2012 | Peterson et al. | |
| 2012/0270644 A1 | 10/2012 | Buhr | |
| 2012/0306877 A1 | 12/2012 | Rosasco | |
| 2013/0034160 A1 | 2/2013 | Schmit | |
| 2013/0198642 A1 | 8/2013 | Carney et al. | |
| 2013/0221923 A1* | 8/2013 | Robertson ........... | H01M 50/247 320/112 |
| 2013/0274000 A1 | 10/2013 | Novotny et al. | |
| 2014/0006517 A1 | 1/2014 | Hsiao et al. | |
| 2014/0019582 A1 | 1/2014 | Kim | |
| 2014/0032670 A1 | 1/2014 | Ellingson et al. | |
| 2014/0179426 A1 | 1/2014 | Perry et al. | |
| 2014/0043333 A1 | 2/2014 | Narayanan et al. | |
| 2014/0179434 A1 | 6/2014 | Xu | |
| 2014/0221087 A1 | 8/2014 | Huang et al. | |
| 2014/0274384 A1 | 9/2014 | Boswell et al. | |
| 2014/0342819 A1 | 11/2014 | Bruno, Jr. et al. | |
| 2015/0009222 A1 | 1/2015 | Diard et al. | |
| 2015/0087414 A1 | 3/2015 | Chen et al. | |
| 2015/0297998 A1 | 10/2015 | Karamfilov et al. | |
| 2016/0001184 A1 | 1/2016 | Sepulveda et al. | |
| 2016/0028854 A1 | 1/2016 | Leeb et al. | |
| 2016/0171757 A1 | 6/2016 | Panneer et al. | |
| 2016/0279523 A1 | 9/2016 | Altagar et al. | |
| 2016/0293134 A1 | 10/2016 | Fortin | |
| 2016/0317921 A1* | 11/2016 | Schmitz .................. | A63F 13/23 |
| 2017/0034234 A1 | 2/2017 | Zimring et al. | |
| 2017/0083396 A1 | 3/2017 | Bishop et al. | |
| 2017/0097816 A1 | 4/2017 | Joshi | |
| 2017/0124812 A1 | 5/2017 | Washington et al. | |
| 2017/0142201 A1 | 5/2017 | Holmes | |
| 2017/0185464 A1 | 6/2017 | Lipinski et al. | |
| 2017/0246544 A1 | 8/2017 | Agarwal et al. | |
| 2017/0354878 A1 | 12/2017 | Posin | |
| 2017/0354893 A1 | 12/2017 | Benedetto et al. | |
| 2018/0176282 A1 | 6/2018 | Benguerah | |
| 2018/0229128 A1 | 8/2018 | Chandrasekaran et al. | |
| 2018/0250591 A1 | 9/2018 | Prado Rojas et al. | |
| 2018/0253880 A1 | 9/2018 | Yeh et al. | |
| 2018/0256981 A1 | 9/2018 | Enomoto | |
| 2019/0199722 A1 | 6/2019 | Pennarun et al. | |
| 2019/0259130 A1 | 8/2019 | Yeh et al. | |
| 2019/0272707 A1 | 9/2019 | Washington et al. | |
| 2019/0308099 A1 | 10/2019 | Lalonde et al. | |
| 2019/0321725 A1 | 10/2019 | Zimring et al. | |
| 2019/0321727 A1 | 10/2019 | Rodgers | |
| 2019/0321732 A1 | 10/2019 | Zimring et al. | |
| 2019/0344163 A1 | 11/2019 | Imada | |
| 2020/0001177 A1 | 1/2020 | Champy | |
| 2020/0111317 A1 | 4/2020 | Oberberger et al. | |
| 2021/0146240 A1 | 5/2021 | Colenbrander | |

FOREIGN PATENT DOCUMENTS

| | | |
|---|---|---|
| CN | 106328855 A | 1/2017 |
| CN | 107050858 A | 8/2017 |
| CN | 107269307 A | 10/2017 |
| CN | 107666943 A | 2/2018 |
| EP | 0632475 A1 | 1/1995 |
| EP | 1374959 A2 | 1/2004 |
| EP | 2546811 A1 | 1/2013 |
| EP | 3610933 A1 | 2/2020 |
| GB | 2331850 A | 2/1999 |
| GB | 2525437 A | 10/2015 |
| JP | 2003236251 A | 8/2003 |
| JP | 2014130589 A | 7/2014 |
| JP | 2015139565 A | 8/2015 |
| KR | 20070082395 | 8/2007 |
| KR | 20070082395 A | 8/2007 |
| WO | 0003407 A1 | 1/2000 |
| WO | 2005010680 A2 | 2/2005 |
| WO | 2008104221 A1 | 4/2008 |
| WO | 2012161102 A1 | 11/2012 |
| WO | 2012170437 A1 | 12/2012 |
| WO | 2014085717 A1 | 6/2014 |
| WO | 2014120369 A1 | 8/2014 |
| WO | 2014186858 A1 | 11/2014 |
| WO | 2015039583 A1 | 3/2015 |
| WO | 2015191965 A2 | 12/2015 |
| WO | 2016183253 A1 | 11/2016 |
| WO | 2017007659 A1 | 1/2017 |
| WO | 2017201472 A1 | 11/2017 |
| WO | 2019074952 A2 | 4/2019 |
| WO | 2019182752 A1 | 9/2019 |
| WO | 2019195300 A2 | 10/2019 |
| WO | 2020102493 A1 | 5/2020 |

OTHER PUBLICATIONS

Notice of Allowance dated Oct. 27, 2022 for Korean Patent Application No. 10-2020-7030955, 4 pages.
Notice of Allowance dated Jun. 29, 2022 for U.S. Appl. No. 17/123,523, 6 pages.
Translation of Korean Office Action dated Apr. 14, 2022 for Korean Application No. 10-2020-7030955, 19 pages.
European Communication pursuant to Article 94(3) EPC dated Mar. 20, 2023 for EP Application No. 19717207.5, 4 pages.
English Translation of Chinese Office Action dated May 21, 2021 for CN Application No. 20198029685.3, 15 pages.
Yoneda, Satoshi, "Completed Understanding of Windows 8 as a Game Environment (6) Windows Store App Version Game and

(56) References Cited

OTHER PUBLICATIONS

Xbox Smart Glass," Oct. 30, 2012; 22 pages; accessed on Aug. 5, 2020 from https://www.4gamer.net/games/126/G012689/20121029010/.
Extended European Search Report dated Jan. 3, 2020 for EP Application No. EP 19199853.3, 10 pages.
Notice of Grant dated Nov. 5, 2019 for JP Application No. JP 2019220516, 7 pages. English machine translation included.
English Translation of Korean Notice of Allowance dated Jan. 28, 2020 for KR Application No. KR 10-2018-7023961, 3 pages.
English Translation of Korean Office Action dated Apr. 15, 2019 for KR Application No. KR 10-2018-7023961, 2 pages.
English Translation of Korean Office Action dated Aug. 18, 2018 for KR Application No. KR 10-2020-7002403, 5 pages.
International Preliminary Report on Patentability dated Apr. 24, 2018 for International Application No. PCT/US2017/033642, 13 pages.
International Search Report and Written Opinion dated Sep. 18, 2017 for International Application No. PCT/US2017/033642, 28 pages.
First Action Interview Office Action Summary dated Feb. 26, 2019 for U.S. Appl. No. 15/599,408, 3 pages.
First Action Interview Pilot Program Pre-Interview Communication dated Jan. 8, 2019 for U.S. Appl. No. 15/599,408, 4 pages.
Notice of Allowance dated Jun. 19, 2019 for U.S. Appl. No. 15/599,408, 6 pages.
Non-Final Office Action dated Jun. 12, 2020 for U.S. Appl. No. 16/566,607, 23 pages.
Final Office Action dated Oct. 16, 2020 for U.S. Appl. No. 16/566,607, 18 pages.
International Search Report and Written Opinion dated Feb. 26, 2019 for International Application No. PCT/US2018/066844, 13 pages.
Non-Final Office Action dated May 15, 2020 for U.S. Appl. No. 15/851,610, 15 pages.
Final Office Action dated Nov. 30, 2020 for U.S. Appl. No. 15/851,610, 33 pages.
International Search Report and Written Opinion dated Feb. 24, 2020 for International Application No. PCT/US2019/061407, 13 pages.
International Preliminary Report on Patentability dated Apr. 14, 2020 for International Application No. PCT/US2018/055055, 13 pages.
International Search Report and Written Opinion dated Apr. 26, 2019 for International Application No. PCT/US2018/055055, 21 pages.
International Search Report and Written Opinion dated Oct. 4, 2019 for International Application No. PCT/US2019/025182, 23 pages.
International Preliminary Report on Patentability dated Oct. 15, 2020 for International Application No. PCT/US2019/025182, 18 pages.
First Action Interview Pilot Program Pre-Interview Communication dated Apr. 9, 2020 for U.S. Appl. No. 16/368,801, 4 pages.
Notice of Allowance dated Jun. 10, 2020 for U.S. Appl. No. 16/368,801, 12 pages.
International Search Report and Written Opinion dated Jun. 18, 2019 for International Application No. PCT/US2019/025185, 11 pages.
International Preliminary Report on Patentability dated Oct. 15, 2020 for International Application No. PCT/US2019/025185, 7 pages.
Notice of Allowance dated May 5, 2020 for U.S. Appl. No. 16/368,806, 8 pages.
International Search Report and Written Opinion dated Jun. 18, 2019 for International Application No. PCT/US2019/022472, 13 pages.
International Preliminary Report on Patentability dated Oct. 15, 2020 for International Application No. PCT/US2019/022472, 8 pages.
Non-Final Office Action dated Jun. 22, 2020 for U.S. Appl. No. 16/373,558, 6 pages.
Notice of Allowance dated Sep. 17, 2020 for U.S. Appl. No. 16/373,558, 9 pages.
International Search Report and Written Opinion dated Sep. 20, 2019 for International Application No. PCT/US2019/026611, 26 pages.
First Action Interview Pilot Program Pre-Interview Communication dated May 21, 2020 for U.S. Appl. No. 16/380,831, 4 pages.
First Action Interview Office Action dated Sep. 2, 2020 for U.S. Appl. No. 16/380,831, 4 pages.
International Search Report and Written Opinion dated Aug. 1, 2019 for International Application No. PCT/US2019/020935, 23 pages.
Slivar, Ivan et al., "Empirical QoE Study of In-Home Streaming of Online Games", 2014 13th Annual Workshop on Network and Systems Support for Games, IEEE, Dec. 4, 2014, 6 pages.
Bernier, Yahn W., "Latency Compensating Methods in Client/Server In-game Protocol Design and Optimization", Game Developers Conference Proceedings, Mar. 20, 2001, 13 pages.
Herrscher et al., "A Dynamic Network Scenario Emulation Tool", Proceedings of the IEEE Eleventh International Conference on Computer Communications and Networks, Oct. 16, 2002; pp. 262-267.
Noble et al., "Trace-Based Mobile Network Emulation", Proceedings of the ACM SIGCOMM'97 Conference on Applications, Technologies, Architectures, and Protocols for Computer Communication; Oct. 1, 1997; pp. 51-61.
International Search Report and Written Opinion dated Oct. 7, 2019 for corresponding International Application No. PCT/US2019/025400, 13 pages.
Ra-Qin, "Ra-Qin Review of the Activision Decathlon—Gamespot," Sep. 2, 2006; XP055625157; retrieved from www.gamespot.com/the-activision-decathlon/user-reviews/2200-128501/ on Sep. 23, 2019; 3 pages.
Non-Final Office Action dated Nov. 29, 2021 for U.S. Appl. No. 17/123,523, 7 pages.
Notice of Allowance dated Mar. 22, 2022 for U.S. Appl. No. 17/123,523, 9 pages.

* cited by examiner

INPUT DEVICE FOR AN ELECTRONIC SYSTEM

CROSS-REFERENCE TO RELATED APPLICATIONS

This application is a U.S. National Stage application under 35 U.S.C. § 371 of International Patent Application Serial No. PCT/US 2019/025400, entitled "Input Device for an Electronic System," and filed on Apr. 2, 2019, which claims priority to U.S. Provisional Patent Application No. 62/779,794, filed on Dec. 14, 2018 and entitled, "Input Device for an Electronic System," to U.S. Provisional Patent Application No. 62/651,542, filed on Apr. 2, 2018 and entitled, "Methods, Devices, and Systems for Interactive Cloud Gaming," and to International Application No. PCT/US2019/022472, filed on Mar. 15, 2019 and entitled, "Methods, Devices, and Systems for Interactive Cloud Gaming," each of which is incorporated herein by reference in its entirety.

TECHNICAL FIELD

The present invention relates to a user input device for an electronic system. In some implementations, the user input device is configured as a video game controller.

BRIEF SUMMARY

A user input device according to some implementations of the present invention may be configured as a video game controller. The user input device may include a plurality of user-actuated controls configured to generate signals which are communicated with an electronic system, such as a computer, cloud-based server, or video game console in order to operate and control the electronic system. The input device may be configured to communicate the signals via a wired connection and/or wirelessly.

In some implementations, an input device according to the present invention may include at least one control pad assembly, for example, a directional control pad (D-pad). In some implementations, the control pad assembly includes a bracket including a support having a bearing surface, a button cap configured to pivot relative to the bracket, the button cap having a peripheral lip and a pivot member configured to abut against the bearing surface of the support, and a return mechanism configured to bias the button cap towards the bracket. In some implementations, the control pad assembly further includes a snap dome film, and the bracket is positioned between the snap dome film and the return mechanism. The snap dome film may be positioned on or against a printed circuit board and be configured to complete an electrical circuit when the button cap is pressed by the user during actuation of the control pad assembly. In some implementations, the button cap further includes one or more contacts which extend toward the snap dome film. The one or more contacts may be configured to push against the snap dome film when the button cap is pivoted with respect to the bracket. In some such implementations, the one or more contacts are sized and positioned to extend below a bottom surface of the bracket.

In some implementations, the return mechanism includes a hub portion positioned at least partially between the button cap and the bracket, and at least a first spring having a fixed end connected to the hub portion and a free end that is configured to deflect relative to the fixed end, the free end being coupled to a first portion of the peripheral lip of the button cap. In some implementations, the hub portion includes a major aperture, and the support of the bracket is received through the major aperture of the hub portion. In some implementations, the fixed end of the first spring is connected to the hub portion by a first arm extending outwardly from the hub portion.

In some implementations, the first spring includes a first spring body between the fixed end and the free end that extends along a first spring axis, and the first arm extends along a first arm axis, and an angle between the first spring axis and the first arm axis is less than 90 degrees (e.g., from 30 degrees to 60 degrees). In some implementations, the bracket includes a first arm support, and wherein at least a portion of the first arm is disposed between the first arm support and the button cap. In some implementations, the first arm includes a minor aperture, and the first arm support includes a post received through the minor aperture of the first arm. In further implementations, the hub portion includes a top surface, and an angle between the first spring axis and a plane of the top surface is greater than 0 degrees when the free end of the first spring is coupled to the peripheral lip of the button cap.

In further implementations, the return mechanism may include a plurality of springs. In some such implementations, the return mechanism may include at least a second spring having a fixed end connected to the hub portion and a free end that is configured to deflect relative to the fixed end of the second spring, the free end of the second spring being coupled to a second portion of the peripheral lip of the button cap. In some implementations, the return mechanism includes at least a third spring having a fixed end connected to the hub portion and a free end that is configured to deflect relative to the fixed end of the third spring, the free end of the third spring being coupled to a third portion of the peripheral lip of the button cap. In yet further implementations, the return mechanism includes at least a fourth spring having a fixed end connected to the hub portion and a free end that is configured to deflect relative to the fixed end of the fourth spring, the free end of the fourth spring being coupled to a fourth portion of the peripheral lip of the button cap. The button cap, in some implementations, includes four or more lobes and each of the first portion, second portion, third portion, and fourth portion of the peripheral lip are located on a different lobe of the button cap.

A battery assembly which may be used with an input device according to various implementations of the present invention includes a battery pack containing one or more cells, the battery pack having a top surface and a bottom surface, a first foam layer coupled to the bottom surface of the battery pack, a battery bracket positioned over the top surface of the battery pack, and a first adhesive layer disposed between the top surface of the battery pack and the battery bracket. In some implementations, the first adhesive layer is or includes a pressure sensitive adhesive (PSA). In some implementations, the first adhesive layer has an area that is less than an area of the top surface of the battery pack. In some implementations, the first adhesive layer includes one or more windows. In some implementations, the first adhesive layer does not cover a central portion of the top surface of the battery pack. In some implementations, the battery pack includes at least two cells. In some such implementations, the battery assembly includes a second adhesive layer disposed between the at least two cells of the battery pack. In some implementations, the battery pack includes a housing surrounding the at least two cells and at least one internal foam member disposed within the housing.

The at least one internal foam member may be positioned on or around at least one of the at least two cells.

In still further implementations, the first foam layer has an area that is less than an area of the bottom surface of the battery pack. In some implementations, the first foam layer comprises one or more foam strips. In some implementations, the battery assembly includes a second foam layer positioned on an external surface of the bracket. In some implementations, the second foam layer includes one or more foam strips. In some implementations, the battery assembly further includes an insulator disposed at least partially around the bracket. In some such implementations, the insulator includes one or more cutouts that are sized and shaped to receive the foam strips of the second foam layer.

BRIEF DESCRIPTION OF THE DRAWINGS

For a better understanding of the various described implementations, reference should be made to the Description of Implementations below, in conjunction with the following drawings in which like reference numerals refer to corresponding parts throughout the figures.

DESCRIPTION OF IMPLEMENTATIONS

Figure 1A:
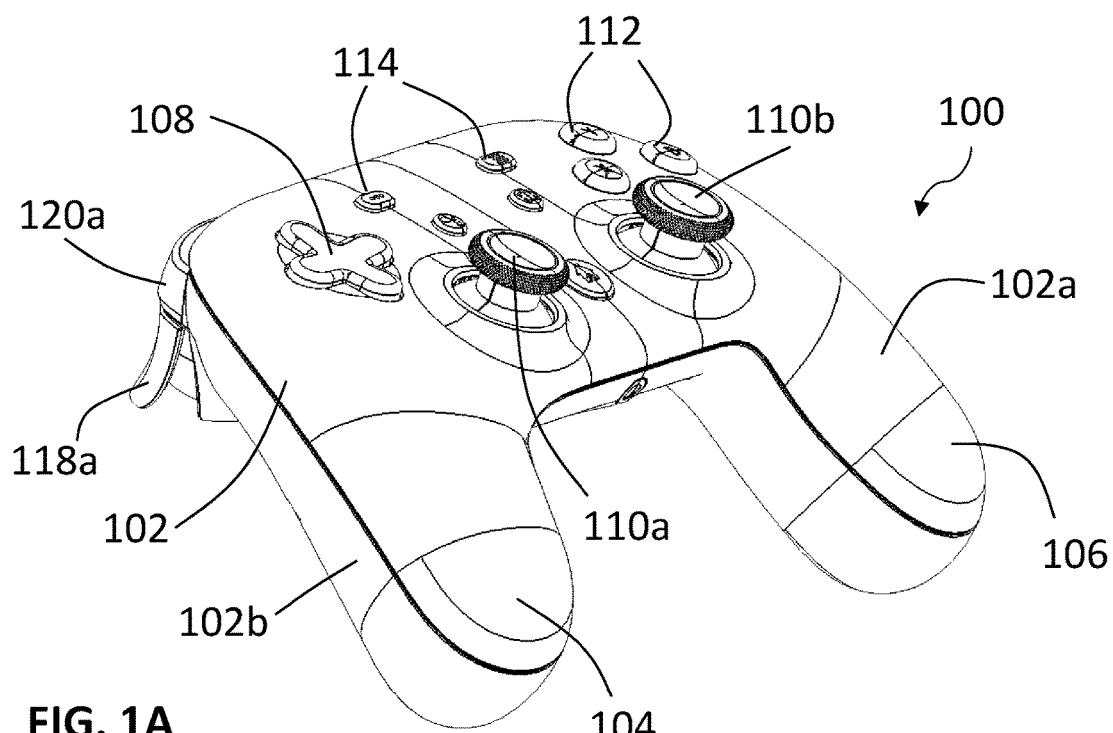
FIG. 1A is a top left perspective view of an input device in accordance with some implementations of the present invention.
Figure 1B:
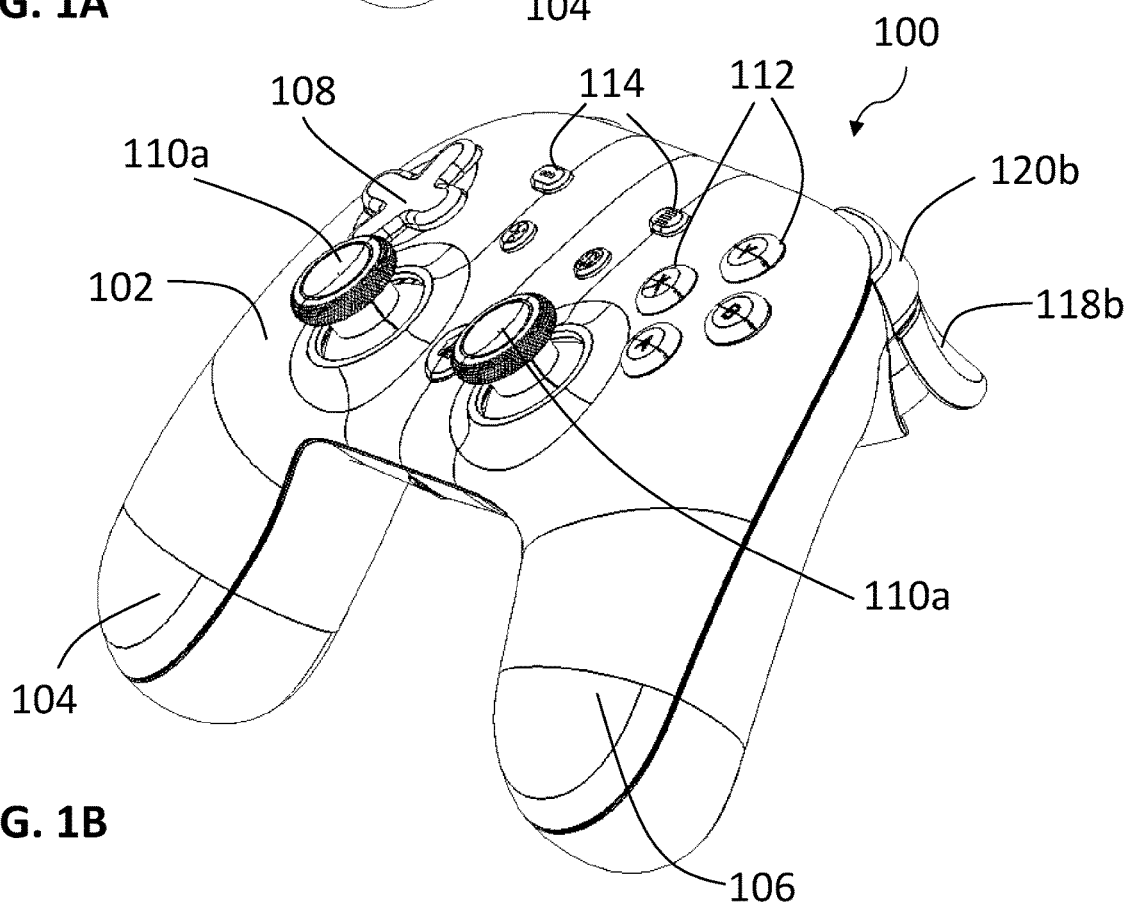
FIG. 1B is a top right perspective view of the input device of FIG. 1A.
Figure 1C:
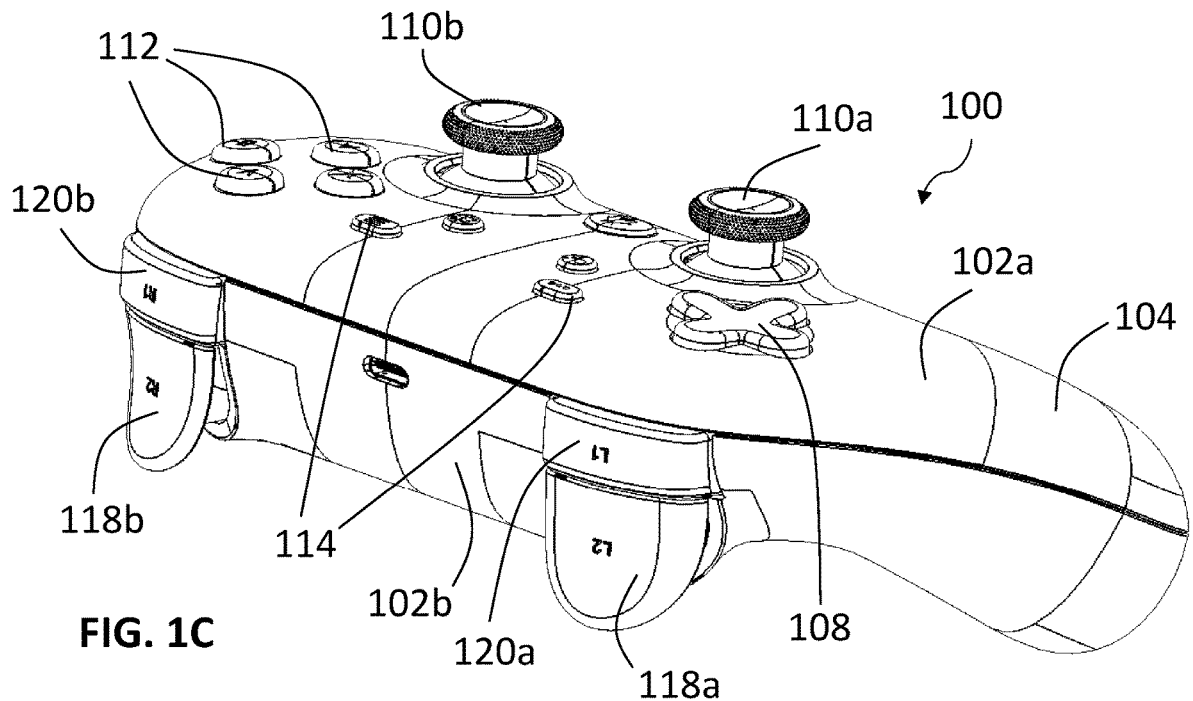
FIG. 1C is a front top perspective view of the input device of FIG. 1A.
Figure 1D:
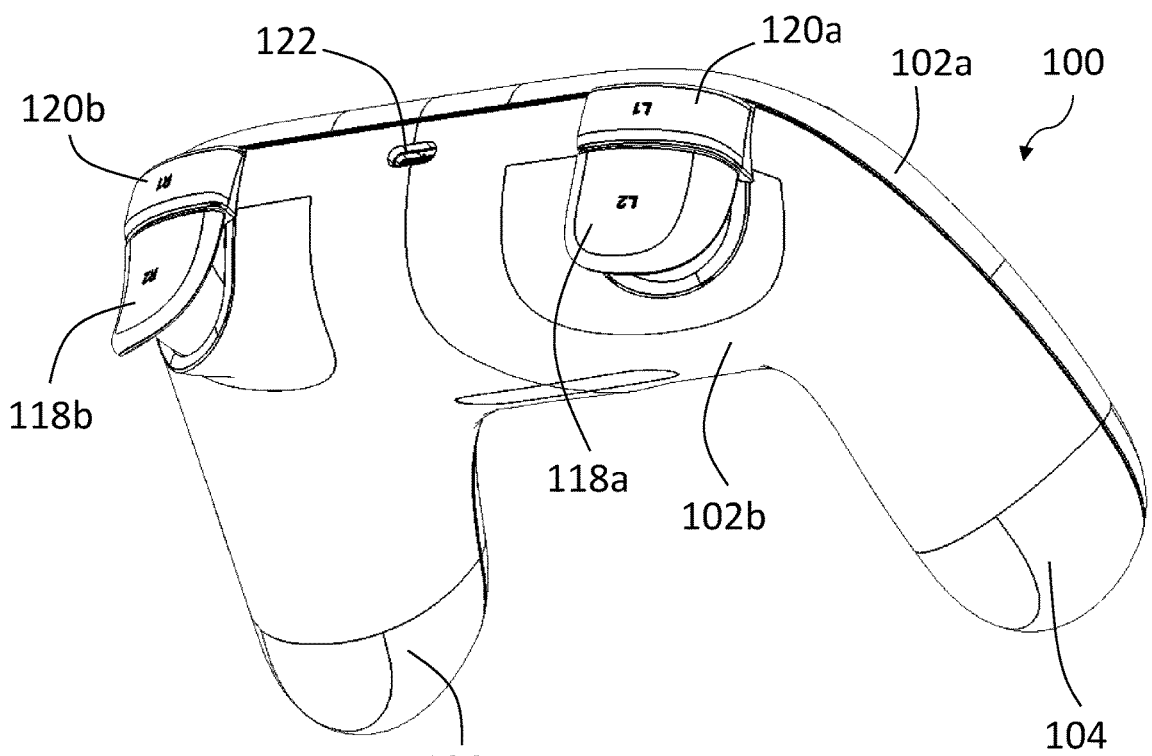
FIG. 1D is a front bottom perspective view of the input device of FIG. 1A.
Figure 1E:
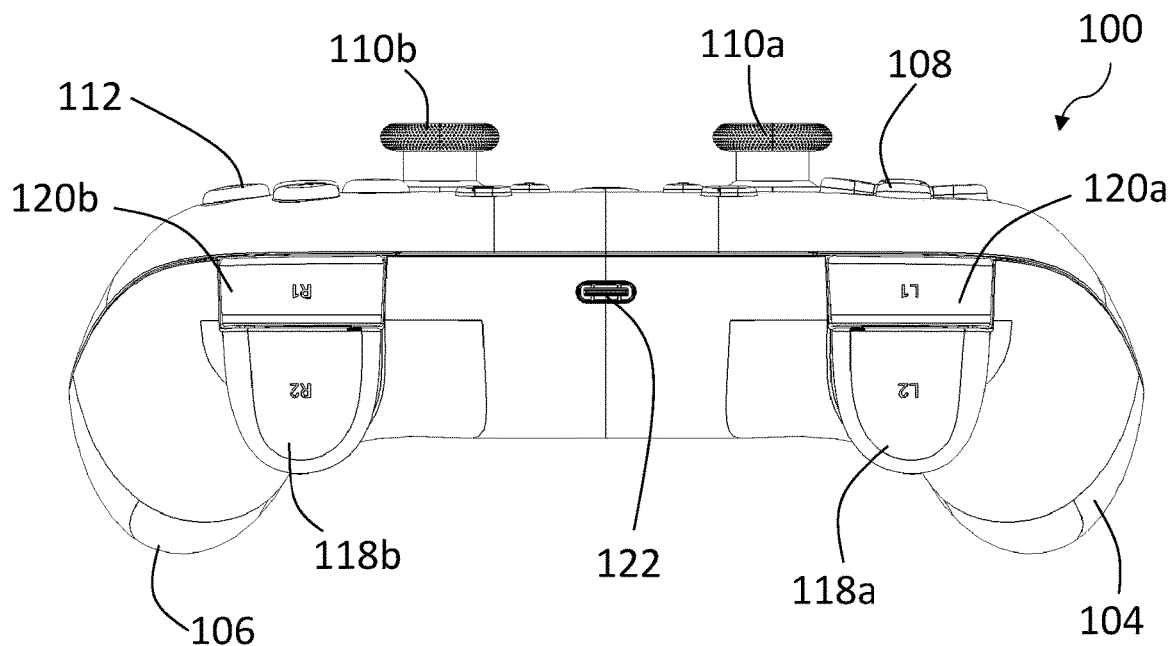
FIG. 1E is a front elevation view of the input device of FIG. 1A.

Reference will now be made in detail to implementations, examples of which are illustrated in the accompanying drawings. In the following detailed description, numerous specific details are set forth in order to provide a thorough understanding of the various described implementations. However, it will be apparent to one of ordinary skill in the art that the various described implementations may be practiced without these specific details. In other instances, well-known methods, procedures, components, circuits, and networks have not been described in detail so as not to unnecessarily obscure aspects of the implementations.

FIGS. 1A-1H illustrate an example input device, generally designated 100, in accordance with certain implementations of the present invention. Input device 100 may be configured to communicate signals to an electronic system in response to inputs received from a user operating input device 100. In some implementations, input device 100 is a video game controller which is configured to receive user inputs for controlling, for example, an object or character in a video game. Input device 100, in some such implementations, is configured to communicate with a game console, computer, and/or cloud server, etc. In some implementations, input device may be configured to communicate with a display device, e.g., a television or monitor. Input device 100, in some implementations may be configured to communicate via a wired connection or wirelessly. In some implementations, input device 100 may be configured to communicate with one or more interface devices which in turn are configured to communicate with one or more of a local network, a communication network, display device, and/or game server. The one or more interface devices may include or be configured to run one or more applications, for example, gaming applications. In some implementations, the one or more interface devices includes a casting device, a hardware dongle, a streaming device, or other device that includes streaming and/or casting functionalities. In some implementations, input device 100 may be, for example, a game controller configured to be used in the systems and methods described in U.S. Provisional Patent Application No. 62/651,542, filed Apr. 2, 2018, and entitled, "Methods, Devices, Systems for Interactive Cloud Gaming," which is incorporated herein by reference in its entirety.

In some implementations, input device 100 is shaped and sized to be held by one or both hands of a user. Input device includes a housing 102 which, in some implementations, may be made from two or more pieces which are joined together. For example, housing 102 may include a top housing 102a and a bottom housing 102b which are secured together to form housing 102 which surrounds and encloses internal components of input device 100. In some implementations, housing 102 is shaped to include one or more grips that are sized and configured to be held by a user's palm and/or fingers. As shown in the illustrated example, input device 100 includes a left grip 104 intended to be held in a user's left hand, and a right grip 106 intended to be held by the user's right hand.

Input device 100 includes one or more controls configured to receive the user input. In some implementations, input device includes a plurality of controls that are configured to be physically actuated or toggled by the user, for example, one or more buttons, control sticks, and/or triggers, etc. In some implementations, input device 100 includes at least one directional control pad assembly 108, which may also be referred to as a "D-pad," that extends through top housing 102a. In some implementations, directional control pad assembly 108 may be a multi-way directional control configured to be operated by a user's thumb, e.g., the user's left thumb while left grip 104 is positioned in the user's left hand. In some such implementations, direction control pad assembly 108 includes a separate button for each directional control. In some implementations, directional control pad assembly 108 is a four-way directional control. In other implementations, directional control pad assembly 108 is an eight-way directional control. In some implementations, input device 100 may include at least one control stick, for example, left and right control sticks 110a, 110b, which extend through top housing 102a. Left and right control sticks 110a, 110b may each be a thumb-operated analog stick which can be pivoted by the user, and wherein input is based on the direction and/or magnitude that the control stick is pivoted in relation to a default center position. In some implementations, for example, each of left and right control sticks may be pivoted in any direction up to 18 degrees to 22 degrees away from the center position. In some implementations, each of left and right control sticks 110a, 110b may be biased toward their respective default center positions by a biasing force such that the user must apply a force greater than the biasing force in order to pivot the control stick.

In further implementations, input device 100 may include a plurality of buttons, for example, action buttons 112 (e.g., "A," "B," "X," and "Y" buttons) which may be positioned to be pressed by a user's right thumb or fingers. Input device 100 may also include one or more function buttons 114 which may include, for example, a selection button, an option button, an assistant button, and/or a share button. Each of such function buttons 114, when pressed, may activate a different function or feature in the electronic system. Input device 100, in some implementations, may also include a separate home button 116. In some implementations, function buttons 114 may be positioned between directional control pad 108 and action buttons 112 and home button 116 may be positioned between left and right control sticks 110a, 110b. Action buttons 112, function buttons 114, and/or home button 116 may each extend through top housing 102a. In some implementations, each of action buttons 112, function buttons 114, and/or home button 116 may include a button cap having a top surface with a different symbol, character, color, design, texture, and/or logo that may be representative of the button's purpose. In some implementations, the symbol, character, color design, texture, and/or logo may be painted/coated, molded, or etched onto the button, for example. In some implementations, the symbol, character, color design, texture, and/or logo is formed from a different material than the rest of the button cap. In further implementations, one or more of action buttons 112, function buttons 114, and/or home button 116 may be illuminated, for example, by a light-emitting diode (LED) positioned beneath or within the button.

In yet further implementations, input device 100 may include one or more triggers and/or one or more bumper buttons positioned at a front of input device 100. In some such implementations, input device includes a left trigger 118a and/or a right trigger 118b, which are configured to be pivoted from a default position to actuate, and may include a biasing device (e.g., spring) configured to bias the triggers to the default position. Input device 100 may also include left and right bumper buttons 120a, 120b which are positioned above left and right triggers 118a, 118b, respectively. In some implementations, input device 100 includes a data port 122, for example, a USB port configured to receive a USB cable. Data port 122 may be positioned on a front portion of input device 100 and, in some implementations, may be located centrally between left and right bumper buttons 120a, 120b. In some implementations, input device 100 further includes a microphone port 124 for receiving audio signals, and an audio jack 126 for connecting to an audio output device (e.g., headphones), each of which may be positioned or a rear portion of input device 100.

Figure 2:
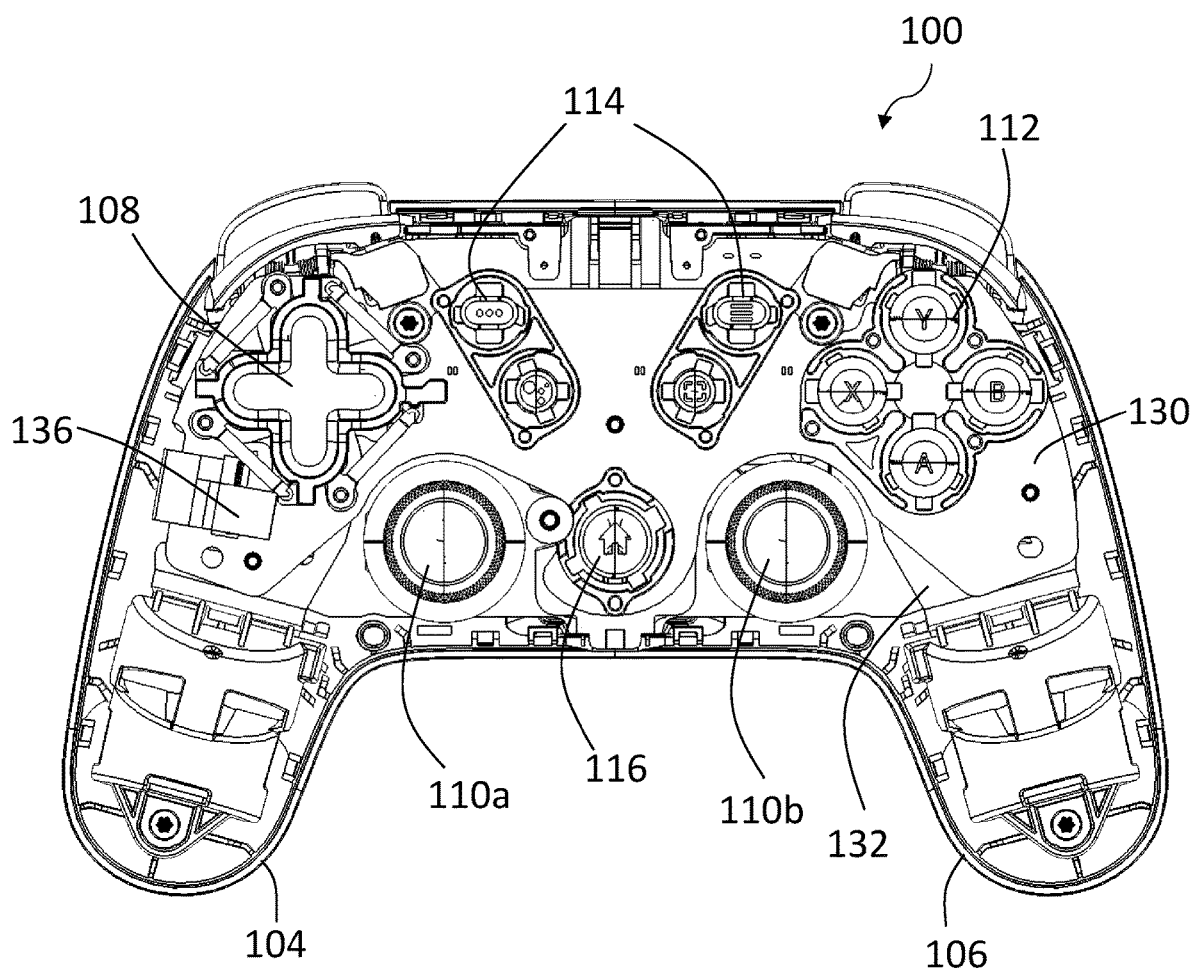
FIG. 2 is a top plan view of the input device of FIG. 1A with the top housing removed.
Figure 3:
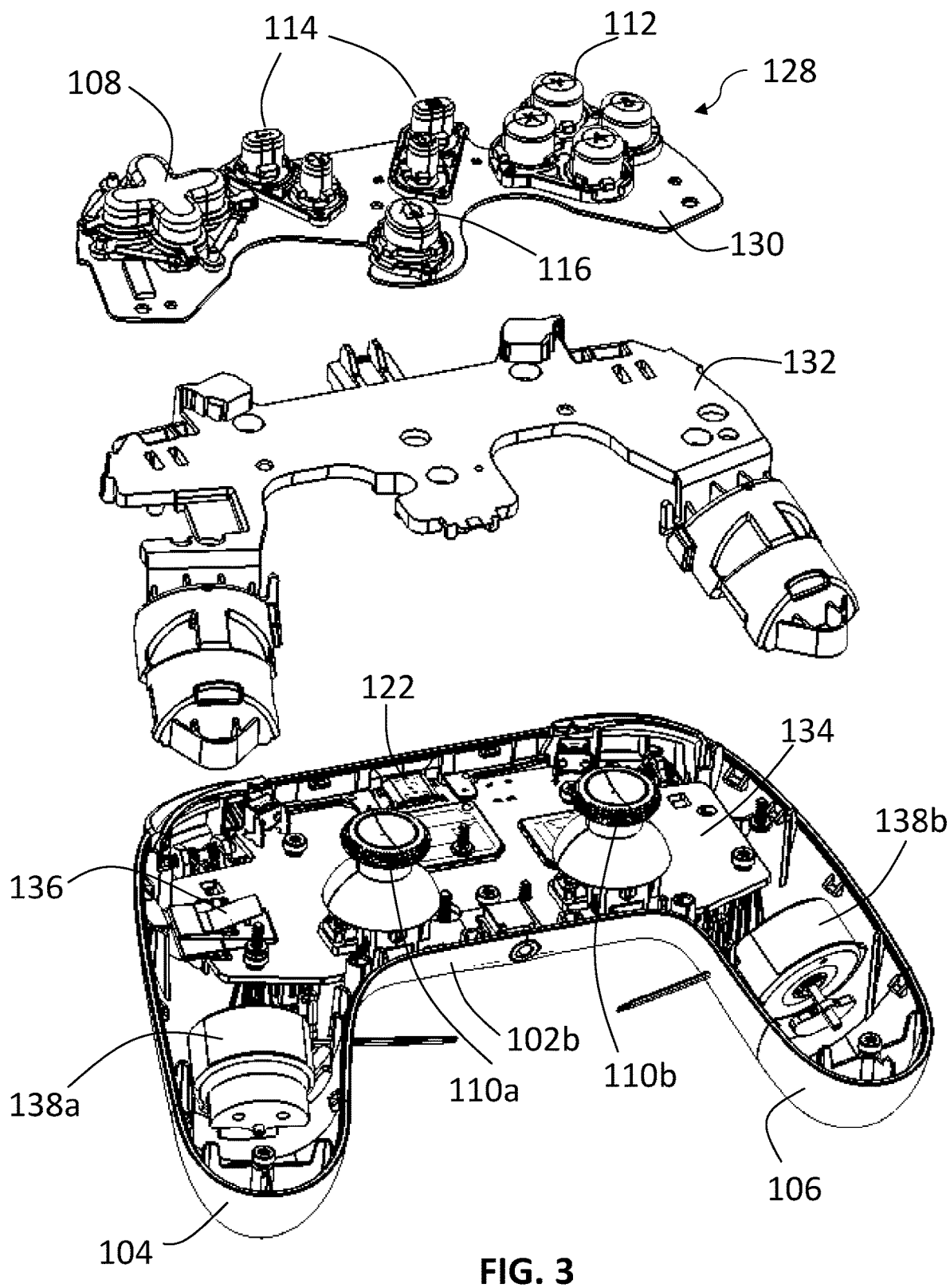
FIG. 3 is a partially exploded perspective view of the input device of FIG. 2.
Figure 5:
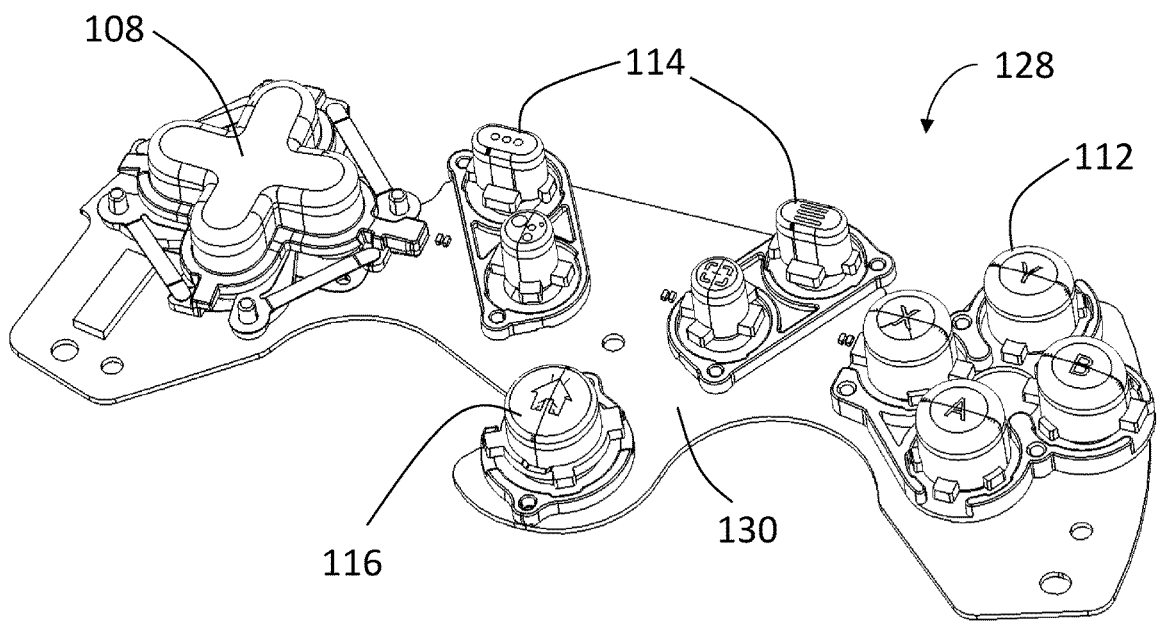
FIG. 5 is an isolated perspective view of the button assembly for the input device of FIG. 1A.

With reference to FIGS. 2, 3 and 5, in some implementations, directional control pad assembly 108, action buttons 112, function buttons 114, and home button 116 are mounted onto a printed circuit board (PCB) 130, which together forms button assembly 128. In some implementations, PCB 130 includes a snap dome film which is configured to complete an electrical circuit when one or more of the buttons of button assembly 128 is pressed to generate an input signal. In some implementations, button assembly 128 may further include one or more LEDs which are positioned and configured to illuminate one or more of action buttons 112, function buttons 114, and home button 116. The one or more LEDs may be mounted onto PCB 130 beneath the button that the LED is configured to illuminate. In some implementations, each of action buttons 112, function buttons 114, and home button 116 may also include a keyed feature such that each button may be positioned and oriented with respect to button assembly 128 and/or openings in top housing 102a in a predetermined manner to ensure a proper positioning and alignment. For example, each button may include at its base differently sized or spaced radial projections that allow the button to fit into specific corresponding openings in top housing 102a.

Figure 4:
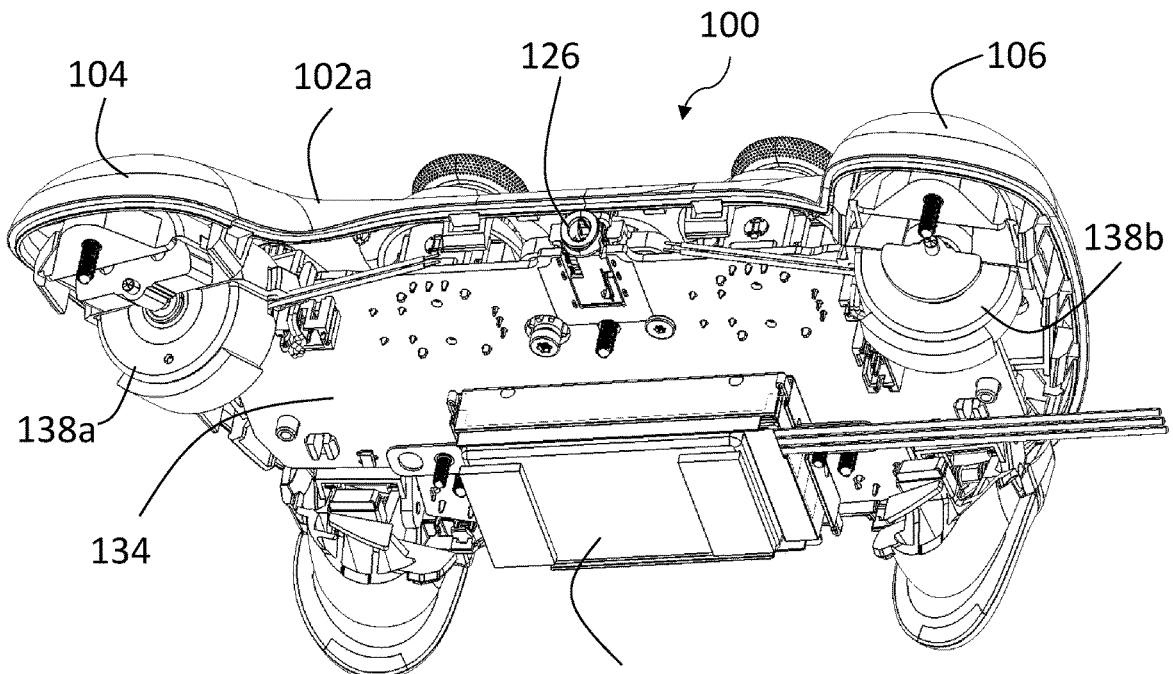
FIG. 4 is a bottom perspective view of the input device of FIG. 1A with the bottom housing removed.

In some such implementations, button assembly 128 is mounted onto a mid-frame 132 which is positioned between button assembly 128 and main printed circuit board 134. Mid-frame 132, in some implementations, may be rigidly constructed to provide support for the internal components of input device 100 and/or housing 102. Main PCB 134 includes, in some implementations, one or more processors, communication modules, wireless transmitters/receivers, memory devices, and/or other circuitry for operating input device 100. In some implementations, a ribbon connector 136 electronically connects PCB 130 to main PCB 134 such that signals received from operation of the buttons of button assembly 128 can be conveyed to main PCB 134. In some implementations, left and right control sticks 110a, 110b may be mounted onto and electrically connected to main PCB 134. PCB 130 and mid-frame 132, in some implementations, may be shaped or contoured to provide clearance for the left and right control sticks 110a, 110b. In some implementations, input device 100 further includes one or more rumble motors 138a, 138b which are configured to vibrate in response to certain signals to create a tactile sensation for the user. Rumble motors 138a, 138b may be positioned within left and right grips 104, 106, respectively and be at least partially surrounded by mid-frame 132. In some implementations, rumble moters 138a, 138b may be sandwiched between mid-frame 132 and bottom housing 102b. As shown in FIG. 4, in some implementations input device 100 additionally includes a battery assembly 140 which may be configured to supply power to input device 100. Battery assembly 140 according to some implementations includes one or more power cells and may be positioned below main PCB 134 and situated between main PCB 134 and bottom housing 102b.

Directional Control Pad Assembly

FIGS. 6-9B show further details of directional control pad assembly 108. In some implementations, directional control pad assembly 108 is configured to have a smaller footprint than other directional control pads known in the art. In some such implementations, having a smaller footprint provides clearance for other components of input device 100 and/or allows positioning of directional control pad assembly 108 closer to other components of input device 100, for example, control stick 110a or other controls. In some implementations, directional control pad assembly 108 includes a bracket 142 which may be mounted onto PCB 130 (FIG. 5). In some implementations, bracket 142 includes a support 144 having a bearing surface 146. In some implementations, bracket 142 includes one or more (e.g., four) arm supports 148 which generally extend radially from support 144. In some implementations, each arm support 148 further includes a post 150 which extends from a top surface of the arm support 148. Posts 150 may be positioned at or proximate an end of arm supports 148. In some implementations, bracket 142 may be constructed as a single, unitary component, and may be made, for example, from a plastic material (e.g., by molding, 3D printing, etc.).

In further implementations, directional control pad assembly 108 further includes a button cap 152 which is configured to pivot relative to bracket 142. Button cap 152 may have a multi-lobe shape, for example, a plus-shape or a quatrefoil shape with four lobes. In some implementations, button cap 152 may have fewer or more than four lobes. Each lobe of button cap 152 may act as a separate button representing a different direction (e.g., up, down, left, right).

In some implementations, button cap 152 includes a pivot member 154 (FIG. 7B) which extends from a bottom of button cap 152 and is shaped and configured to bear against bearing surface 146 of bracket 142. In some implementations, pivot member 154 includes a convexly curved surface (e.g., spherically curved) and bearing surface 146 includes a concavely curved surface. In some implementations, button cap 152 further includes a peripheral lip 156 which extends outwardly from a base of button cap 152. In some such implementations, peripheral lip 156 includes one or more tabs 158 extending from peripheral lip 156. In some implementations, a largest dimension of button cap 152 is the largest dimension of directional control pad assembly 108. In some implementations, each lobe of button cap 152 includes a tab 158. In some implementations, at least one tab 158 may include an extension 158a. In some implementations, extension 158a may be shaped to function as a keyed feature such that, for example, button cap 152 can be oriented in a predetermined position with respect to housing 102 and/or other components during assembly. In further implementations, each lobe of button cap 152 includes a contact 160 which extends below each lobe. Contacts 160, in some implementations, are configured to extend toward and press against a snap dome film positioned against PCB 130 when the button cap 1520 is pivoted with respect to the bracket. In some implementations, contacts 160 extend between arm supports 148 and below a bottom surface of bracket 142.

Figure 8:
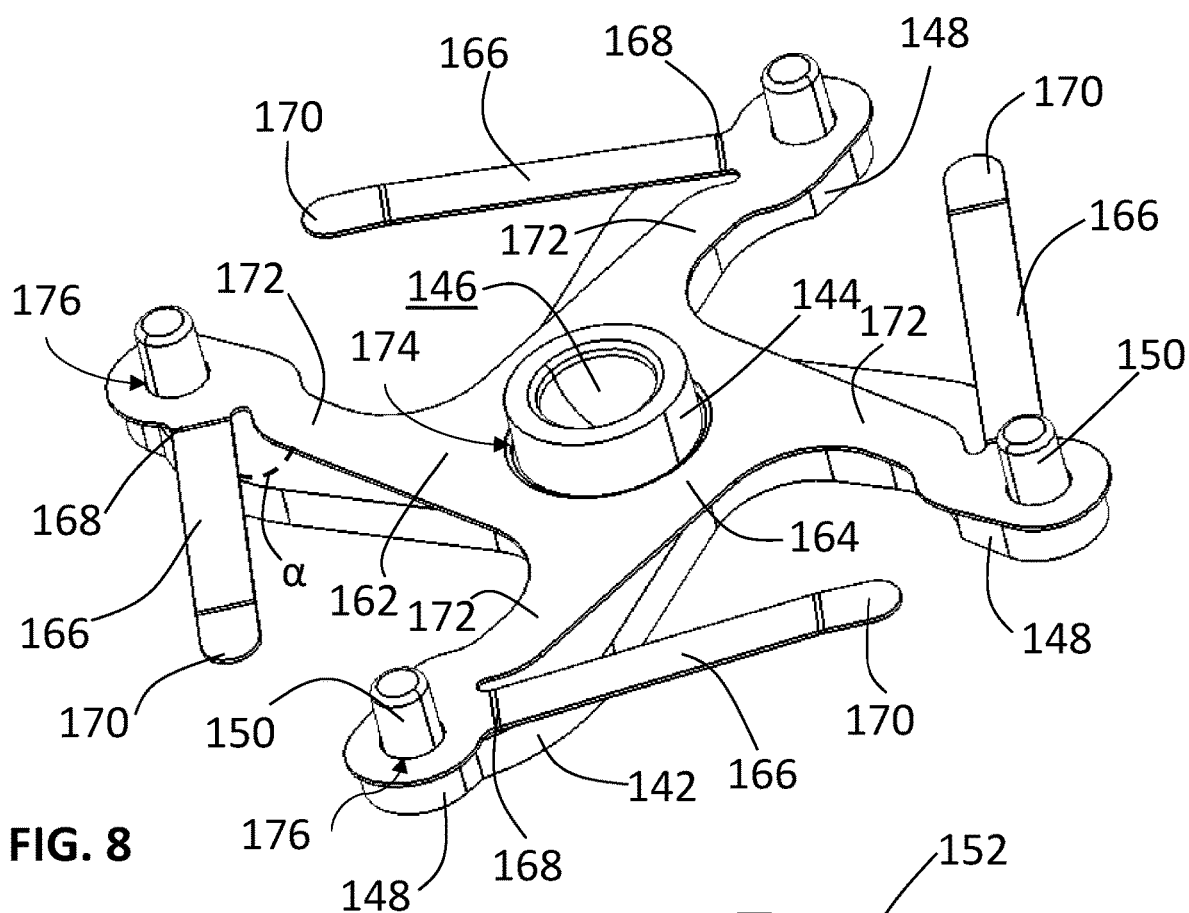
FIG. 8 is a top perspective view of the return mechanism mounted onto the bracket of the control pad assembly.
Figure 9A:
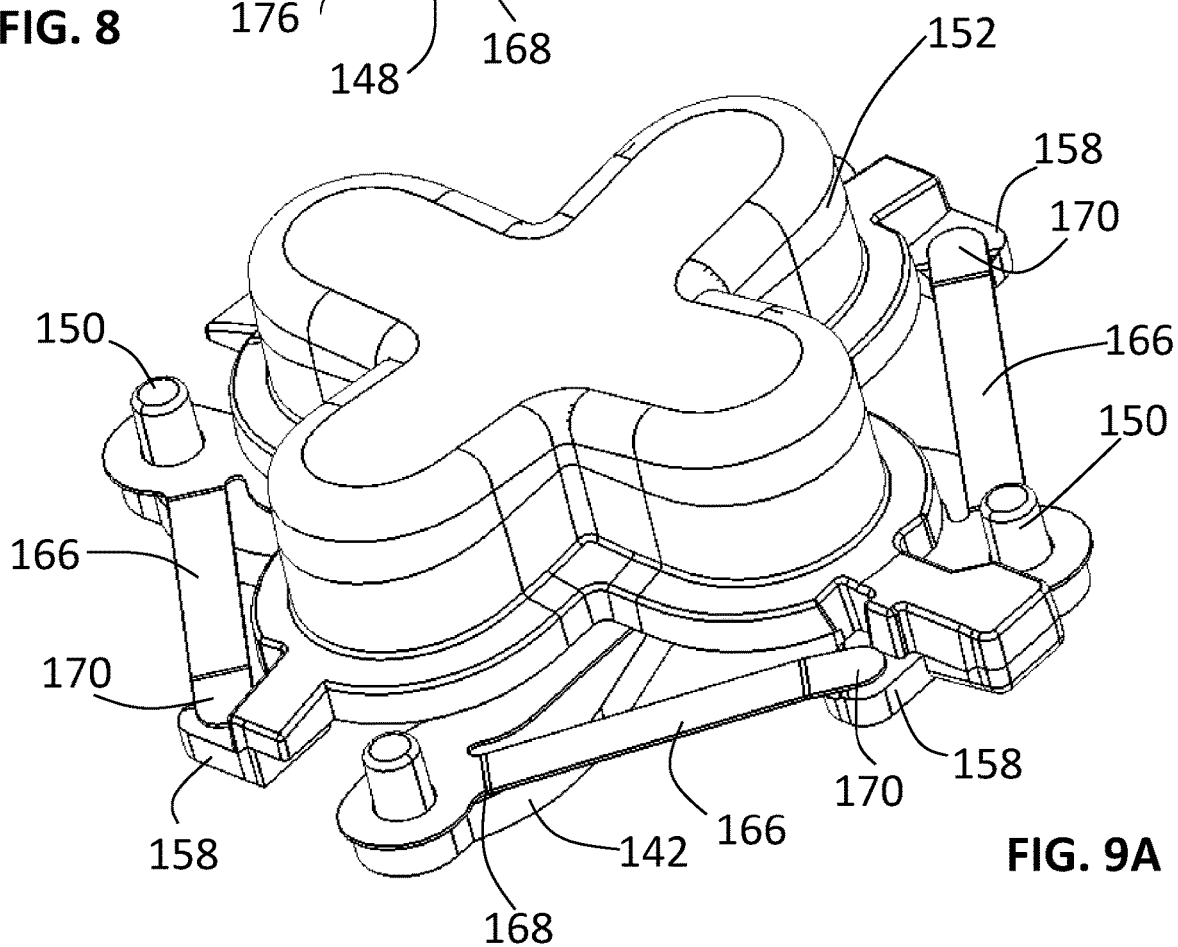
FIG. 9A is a top perspective view of the assembled control pad assembly.
Figure 9B:
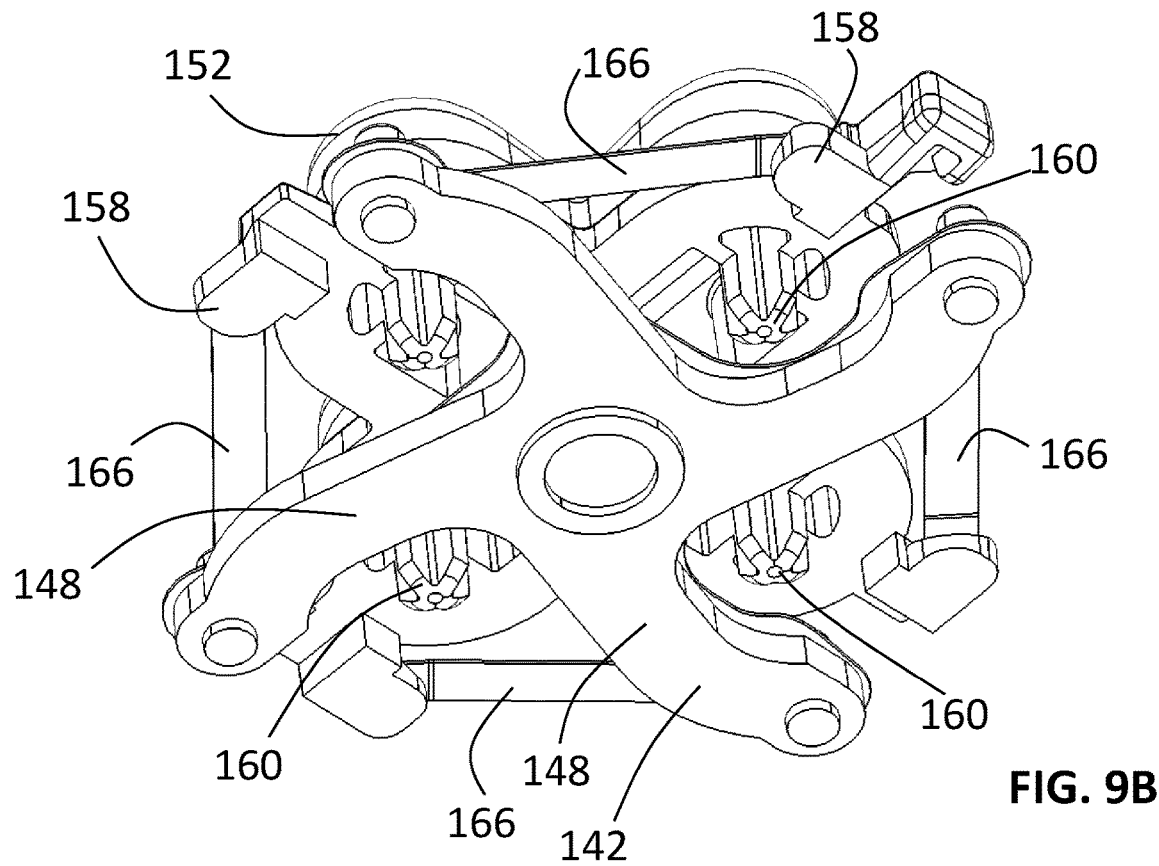
FIG. 9B is a bottom perspective view of the assembled control pad assembly of FIG. 9A.

In some implementations, directional control pad assembly 108 further includes a return mechanism 162 configured to bias button cap 152 towards bracket 142. In some implementations, return mechanism 162 is configured to bias button cap 152 to a default position when directional control pad assembly 108 is not being actuated by the user. In some implementations, return mechanism 162 includes a hub portion 164 positioned at least partially between button cap 152 and bracket 142. Return mechanism 162 includes one or more springs 166, each spring 166 having a fixed end 168 connected to hub portion 164 and a free end 170 that is configured to deflect relative to the fixed end 168. In some implementations, each spring 166 is configured as a cantilever spring. In some implementations, free end 170 of each spring 166 is coupled to a portion of the peripheral lip 156 of button cap 152. In some implementations, return mechanism 162 includes at least one spring 166 for each lobe of button cap 152. In some implementations, each free end 170 of springs 166 is coupled to a different tab 158 of button cap 152. In some implementations, coupling of free end 170 to a tab 158 of button cap 152 causes the free end 170 to deflect relative to the fixed end 168 of the spring 166. In some implementations, hub portion 164 includes a generally planar top surface, and an angle between the spring 166 and a plane of the top surface is greater than 0 degrees when the free end 170 of the spring 166 is coupled to the peripheral lip 156 of button cap 152. In some implementations, each fixed end 168 is connected to the hub portion 164 by an arm 172 extending outwardly from the hub portion 164. In some implementations, as shown in FIG. 8, an angle α between each spring 166 and the arm 172 which connects the spring 166 to hub portion 164 is less than 90 degrees, e.g., from 30 degrees to 50 degrees. Angle α may be substantially the same for each spring 166 of return mechanism 162. Return mechanism 162 may be made of an elastic material, for example, spring steel or other resilient metal. In some implementations, return mechanism 162 is made from a monolithic piece of material, e.g., by machining, laser cutting, etc.

Figure 6:
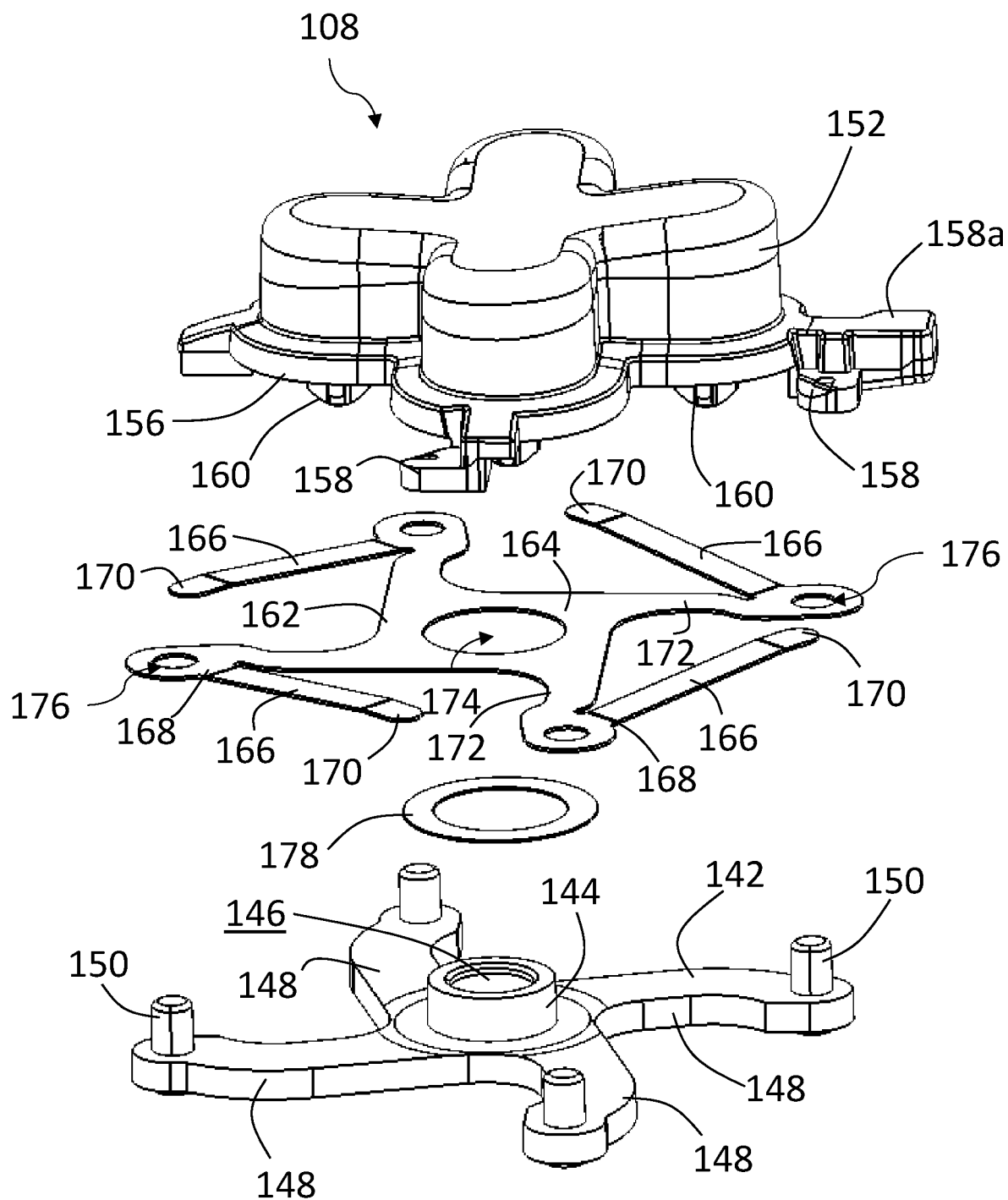
FIG. 6 is an exploded perspective view of a control pad assembly in accordance with some implementations of the present invention.
Figure 7A:
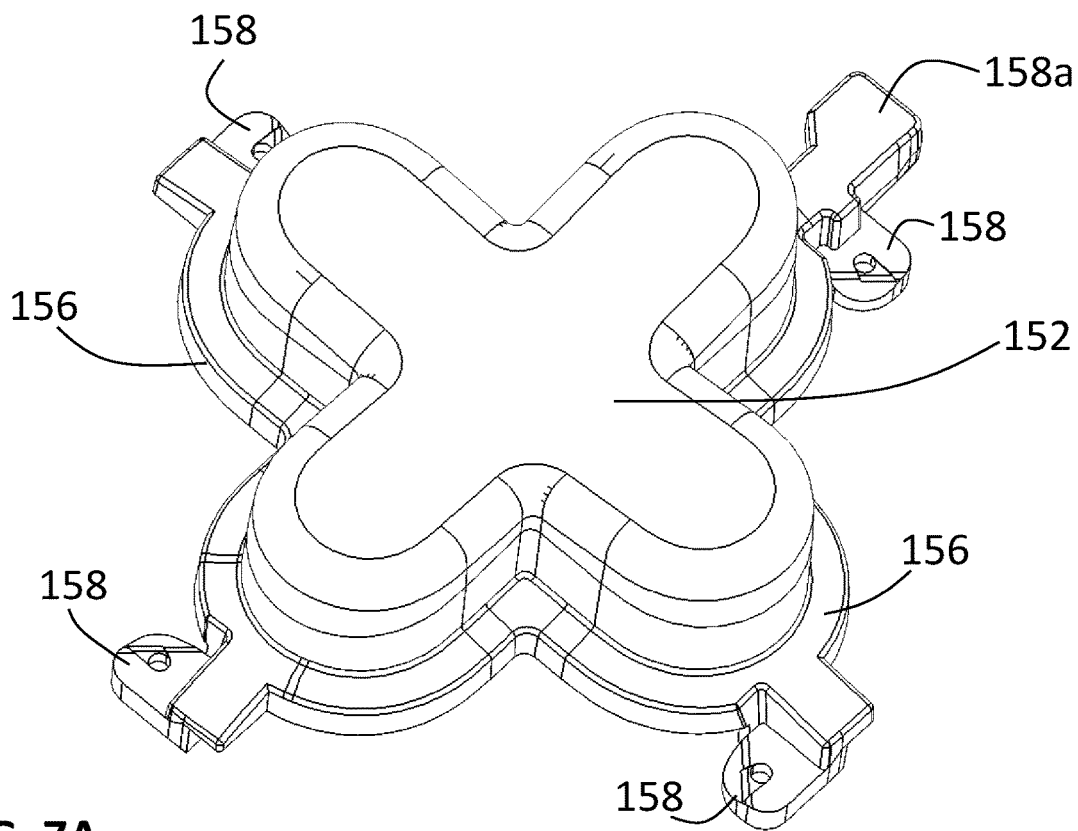
FIG. 7A is a top perspective view of the cap of the control pad assembly of FIG. 6.
Figure 7B:
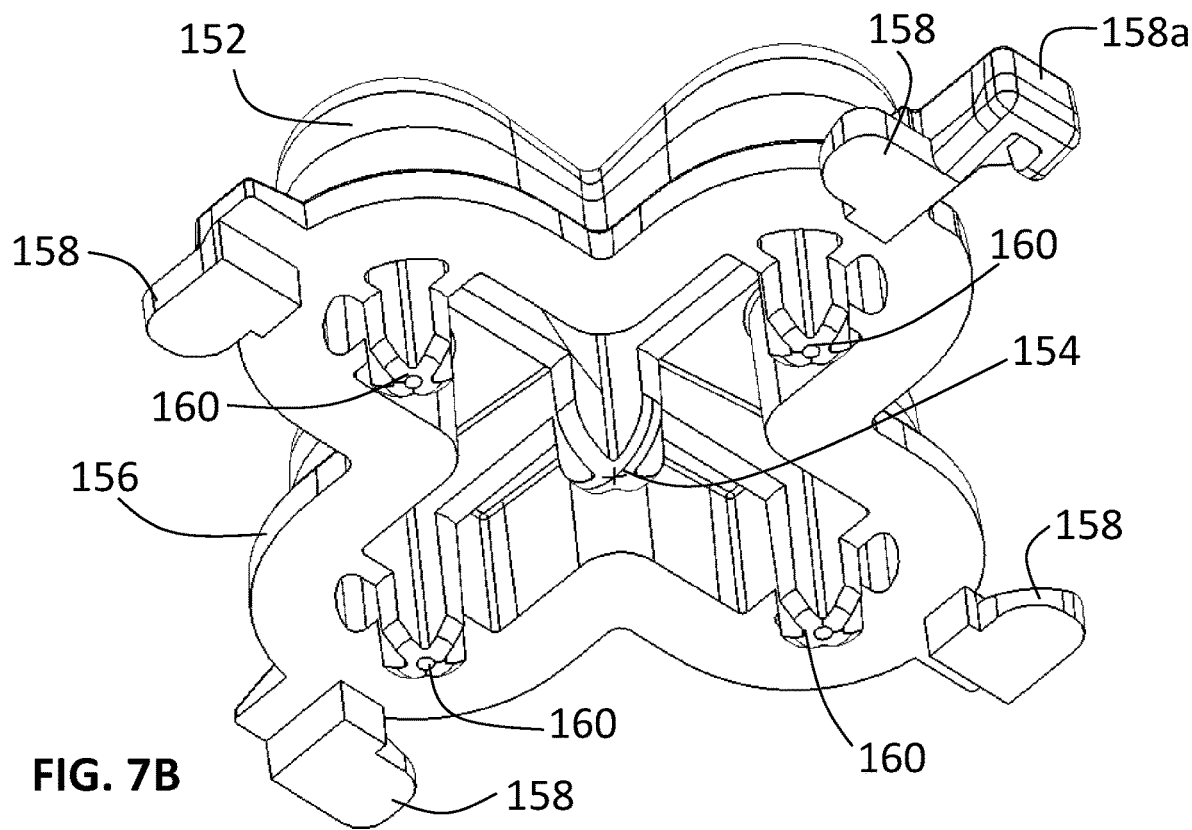
FIG. 7B is a bottom perspective view of the cap of FIG. 7A.

In some implementations, hub portion 164 of return mechanism 162 includes a main aperture 174. In some such implementations, support 144 of bracket 142 is received through main aperture 174. In some implementations, pivot member 154 of button cap 152 is received through main aperture 174. In some implementations, main aperture 174 is centrally positioned on hub portion 164. In some implementations, one or more of arms 172 includes a further minor aperture 176 which is shaped and sized to receive a post 150 of bracket 142. In some implementations, posts 150 received through further apertures 176 help prevent return mechanism 162 from rotating with respect to bracket 142. Minor aperture 176 may be smaller in dimension (e.g., diameter) than main aperture 174 according to some implementations. In some implementations, as shown in FIG. 8, each arm 172 of return mechanism 162 may be at least partially disposed on a different arm support 148 of bracket 142. In some implementations, an adhesive layer 178 may be disposed between return mechanism 162 and bracket 142 to assist in securing the two components together (FIG. 6). In some implementations, adhesive layer 178 may be shaped as a ring that is configured to seat around support 144 of bracket 142 and to adhere to hub portion 164 of return mechanism 162.

Battery Assembly

Figure 10:
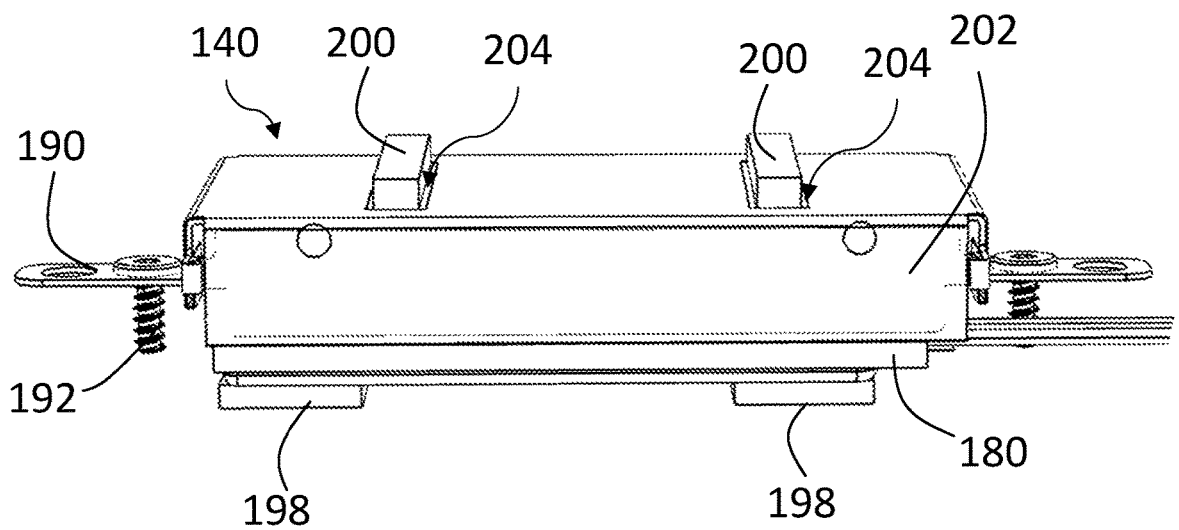
FIG. 10 is an isolated perspective view of a battery assembly for use with an input device in accordance with some implementations of the present invention.
Figure 11:
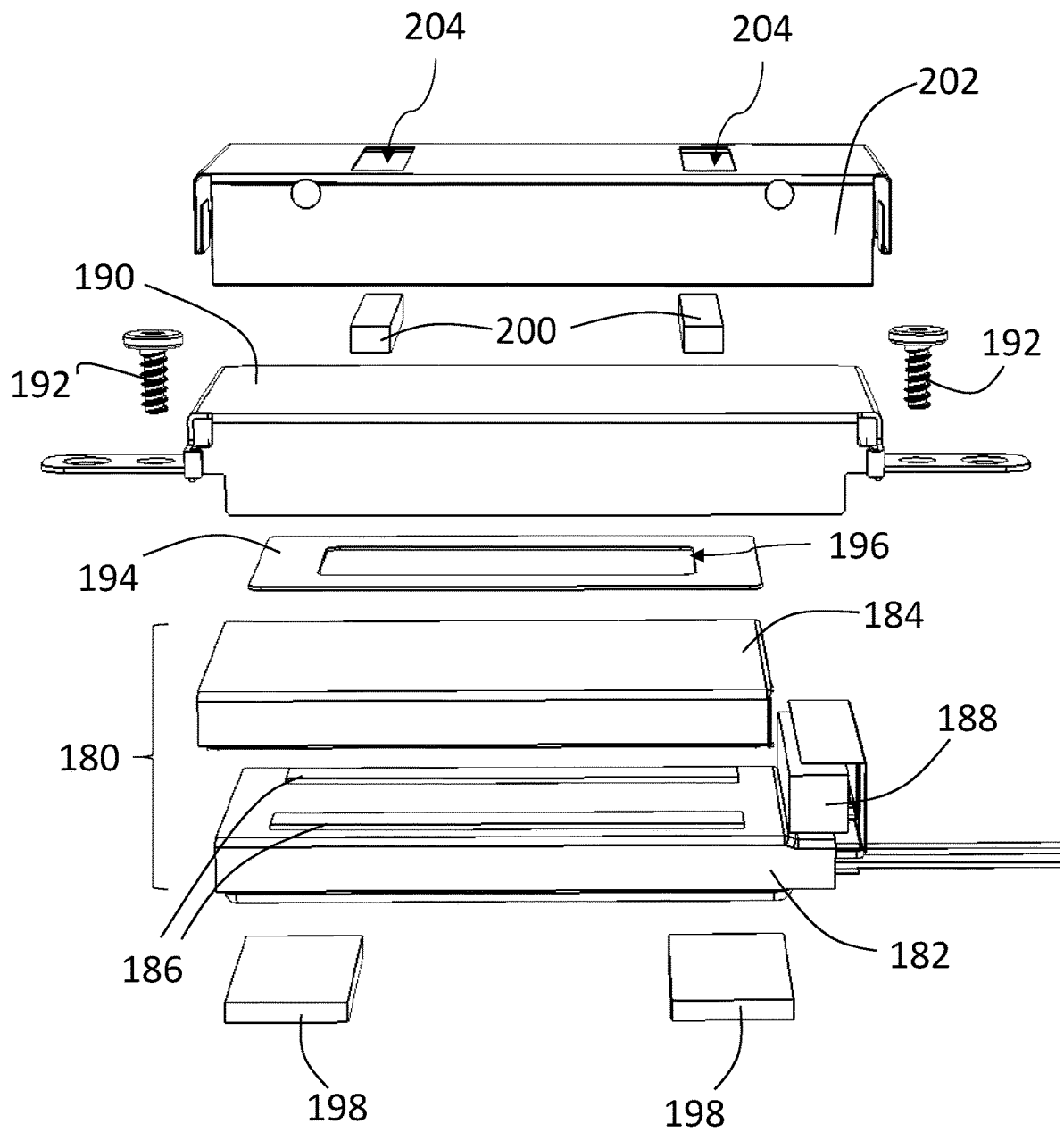
FIG. 11 is an exploded view of the battery assembly of FIG. 10.

FIGS. 10 and 11 show further details of battery assembly 140. As discussed with reference to FIG. 4, battery assembly 140 may be mounted below main PCB 134 according to some implementations and includes a battery pack containing one or more battery cells. In some implementations, battery assembly 140 is configured to improve thermal performance by providing gaps between various components to allow for air flow and/or physical expansion of components. In some implementations, battery assembly 140 includes a battery pack 180 which includes at least one cell. Battery pack 180 may include, for example, a rechargeable lithium-ion cell. In some implementations, battery pack 180 includes at least two cells 182, 184. In some implementations, battery pack 180 includes a housing which houses the one or more cells 182, 184. In some implementations, battery pack 180 further includes an adhesive layer 186 disposed between cells 182, 184. The adhesive layer 186 may include one or more strips of pressure sensitive adhesive (PSA) and is preferably sized to cover an area that is less than the surface of cell 182 or 184. In some implementations, adhesive layer 186 includes two strips of PSA with a gap therebetween. In other implementations, adhesive layer 186 may be ring-shaped and includes an opening. In some such implementations, adhesive layer 186 provides a gap or space between cells 182 and 184 to allow for expansion of the one or more of cells 182 and 184. In further implementations, battery pack 180 further includes at least one internal foam member 188. The at least one internal foam member 188 in some implementations provides improved cell tab reliability. The at least one internal foam member 188 may be disposed within the housing of battery pack 180 on or around at least one of the cells 182, 184.

In some implementations, battery assembly 140 further includes a bracket 190 which surrounds at least a portion of battery pack 180. In some implementations, bracket 190 is configured to help physically protect battery pack 180. In some implementations, bracket 190 acts a heat spreader for dissipating heat from battery pack 180. In some implementations, bracket 190 may be used to secure battery assembly 140 to bottom housing 102b via, for example, one or more screws 192. In some implementations, bracket 190 is positioned between battery pack 180 and main PCB 134. Disposed between bracket 190 and battery pack 180 may be an adhesive layer 194. Adhesive layer 194 may be positioned on a top surface of battery pack 180 and may include a PSA. In some such implementations, adhesive layer 194 has an area that is less than an area of the top surface of the battery pack 180. In some implementations, adhesive layer 194 is shaped and sized so as not to cover a central portion of the top surface of battery pack 180. In some implementations, adhesive layer 194 may be shaped to have a window or opening 196 as illustrated. Window or opening 196, according to some implementations, provides further clearance to allow for expansion of battery pack 180 during use. In some implementations, window or opening 196 is positioned to overlay a central portion of the top surface of battery pack 180. In other implementations, adhesive layer 194 may include two or more separate strips of PSA that are spaced apart by one or more gaps.

In some implementations, battery assembly 140 may include a bottom foam layer 198 coupled to the bottom surface of the battery pack 180. In some implementations, bottom foam layer 198 is positioned between battery pack 180 and bottom housing 102b. In some implementations, the bottom foam layer 198 has an area that is less than an area of the bottom surface of battery pack 180. In some implementations, bottom foam layer 198 includes one or more foam strips or blocks. In some such implementations, bottom foam layer 198 includes at least two foam strips or blocks that are separated by a gap.

In yet further implementations, battery assembly 140 may include a top foam layer 200 coupled to a top surface of bracket 190. In some implementations, top foam layer 200 is positioned between bracket 190 and a bottom surface of main PCB 134. In some implementations, top foam layer 200 is configured to provide spacing between main PCB 134 and bracket 190 to ensure that main PCB 134 does not make direct contact with bracket 190. Furthermore, in some implementations, spacing bracket 190 away from main PCB 134 can help in dissipating heat from battery assembly 140. In some implementations, top foam layer 200 has an area that is less than an area of the top surface of bracket 190. In some implementations, top foam layer 200 includes one or more foam strips or blocks. In some such implementations, top foam layer 200 includes at least two foam strips or blocks that are separated by a gap.

Battery assembly, in some implementations, may also include a bracket insulator 202. In some embodiments, bracket insulator 202 is disposed between bracket 190 and main PCB 134. Bracket insulator 202, in some embodiments, prevents main PCB 134 from contacting bracket 190. In some implementations, bracket insulator 202 is positioned on and around at least a top portion of bracket 190. In some such implementations, bracket insulator 202 includes cutouts or openings 204 which are sized and shaped to allow the foam strips or blocks of top foam layer 200 to extend through bracket insulator 202 when bracket insulator 202 is positioned around bracket 190, as depicted in FIG. 10.

Trigger and Bumper Button Assembly

Input device 100, in some implementations, includes left and right triggers 118a, 118b and may further include left and right bumper buttons 120a, 120b. As shown in the FIGS. 1C and 1D, for example, the triggers 118a, 118b and bumper buttons 120a, 120b may be positioned at a front portion of input device 100 and be configured to move relative to housing 102 when actuated by a user. In some implementations, left and right bumper buttons 120a, 120b may be positioned above left and right triggers 118a, 118b, respectively, and be actuated independently. In some implementations, triggers 118a, 118b and bumper buttons 120a, 120b are each configured to interact with a different element on main PCB 134 when actuated. In some implementations, left and right triggers 118a, 118b are analog controls which are configured to interact with sensors on main PCB 134 capable of sensing the relative position of left and right triggers. In some embodiments, each of left and right bumper buttons 120a, 120b is configured to contact switches (e.g., tact switches) on main PCB 134 when pressed in order to generate a signal.

In some implementations, left and right triggers 118a, 118b are each configured to be rotated from an unactuated default position toward bottom housing 102b during actuation (e.g., as shown by the arrow in FIG. 1H), and may include a biasing device (e.g., spring) configured to bias the triggers away from bottom housing 102b back towards the default position. In some implementations, the signals generated by the actuation of left and right triggers 118a, 118b may be functions of the angle to which the trigger is rotated away from the default position. In some implementations, each of left and right triggers 118a, 118b are configured to rotated up to 25 degrees away from the default position.

Figure 12:
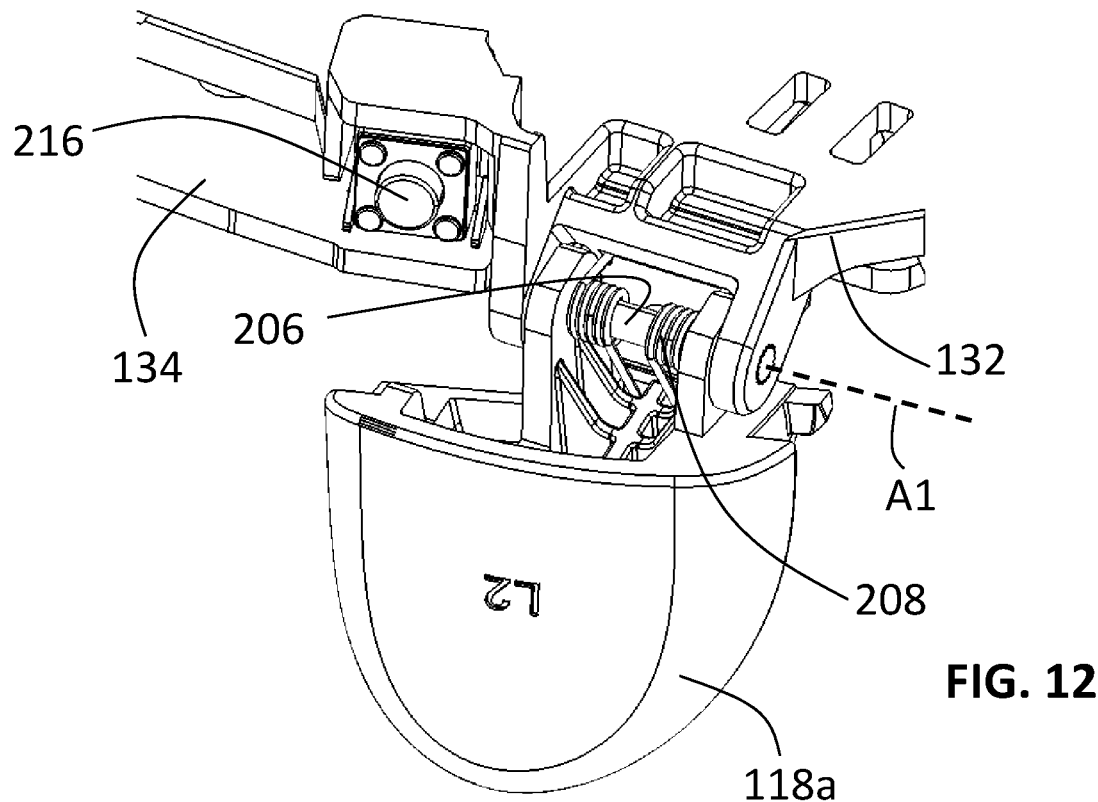
FIG. 12 is a partial perspective view of a left trigger mounted onto the mid-frame in accordance with some implementations.
Figure 13A:
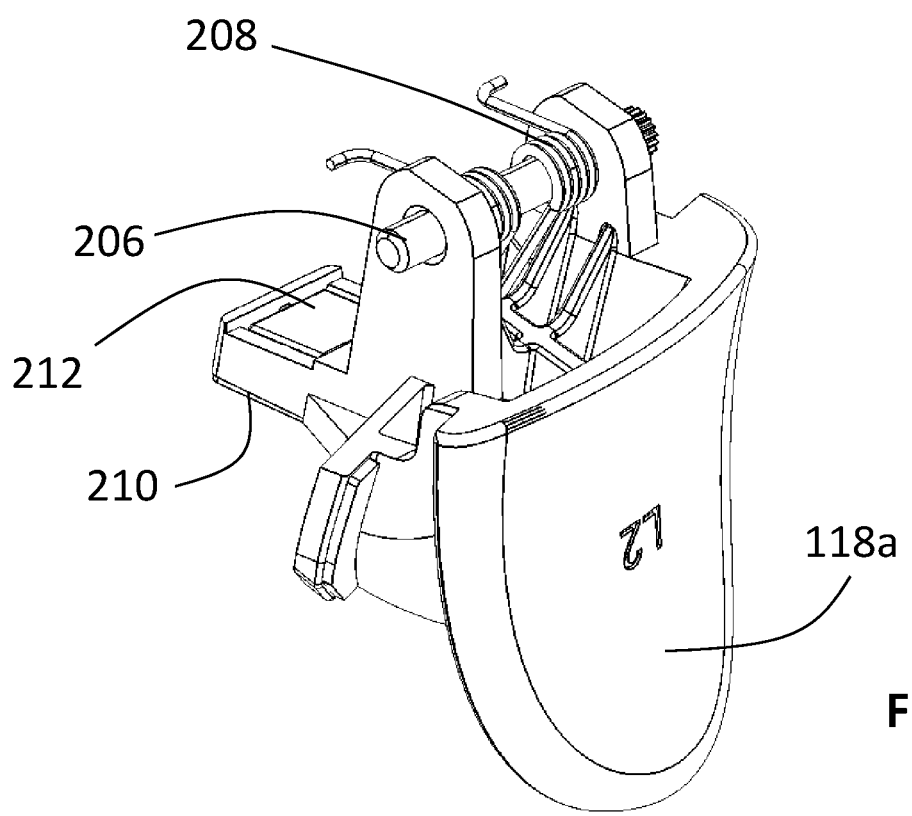
FIG. 13A is an isolated front perspective view of a left trigger shown in FIG. 12.
Figure 13B:
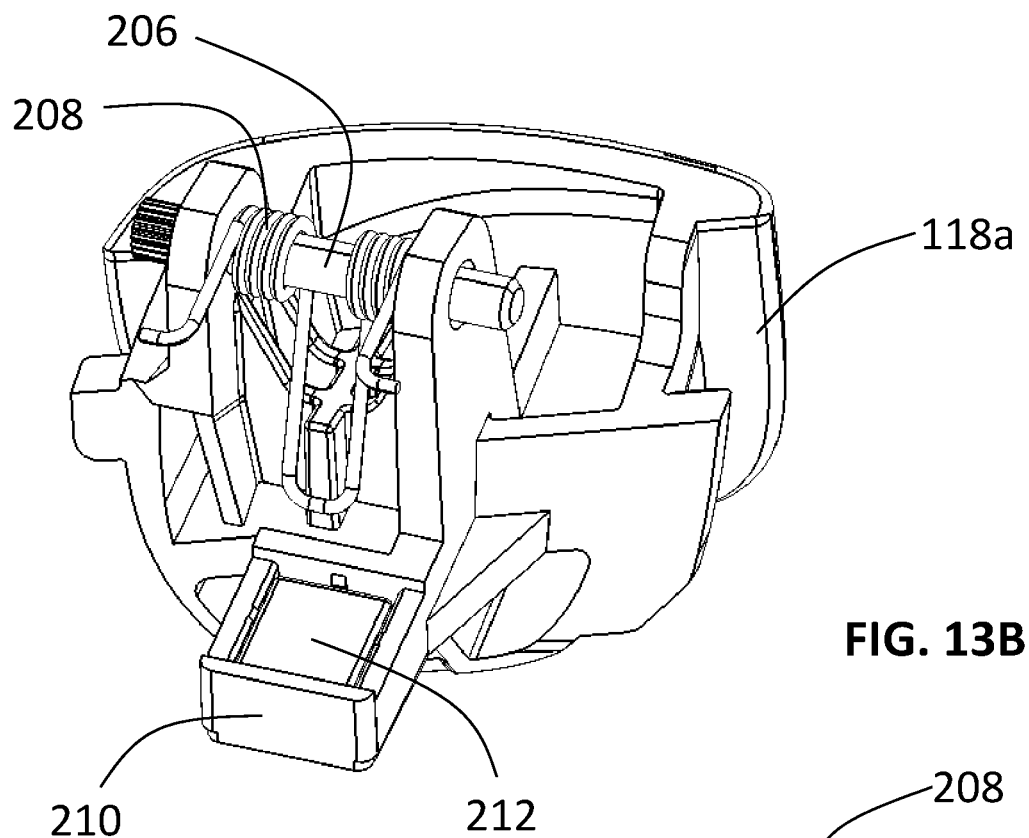
FIG. 13B is a rear perspective view of the left trigger shown in FIG. 13A.
Figure 13C:
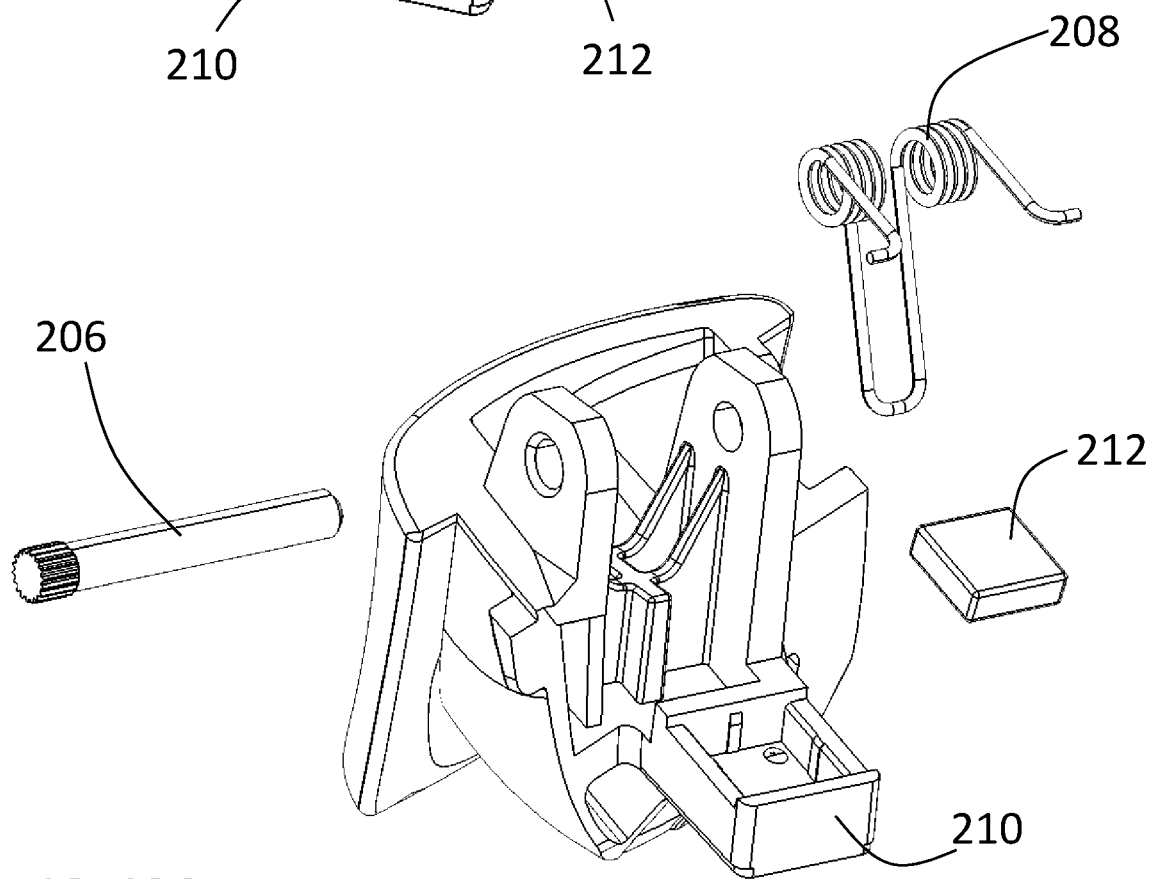
FIG. 13C is an exploded rear perspective view of the left trigger shown in FIG. 13A.

In some implementations, left and right triggers 118a, 118b may be pivotally mounted onto a front portion of mid-frame 132. FIG. 12 shows left trigger 118a pivotally mounted onto mid-frame 132, for example, by a hinge pin 206 such that trigger 118a is configured to rotate, at least partially, about an axis A1 that is coaxial with hinge pin 206. Hinge pin 206 may be, for example, about 2.0 mm in diameter and about 15.4 mm in length according to some implementations, and may be made of steel or other metal/metal alloy. In further implementations, trigger 118a may further include a biasing element which is configured to limit the rotation of trigger 118a and/or bias trigger 118a to the unactuated default position. In some implementations, as shown in FIGS. 12-13C for example, the biasing element is or includes a spring 208 which may be a torsion spring. As shown in the illustrated implementations, spring 208 may include one or more coiled sections disposed around hinge pin 206. While FIGS. 12-13C show only left trigger 118a, it should be appreciated that right trigger 118b may be similarly configured.

Figure 14C:
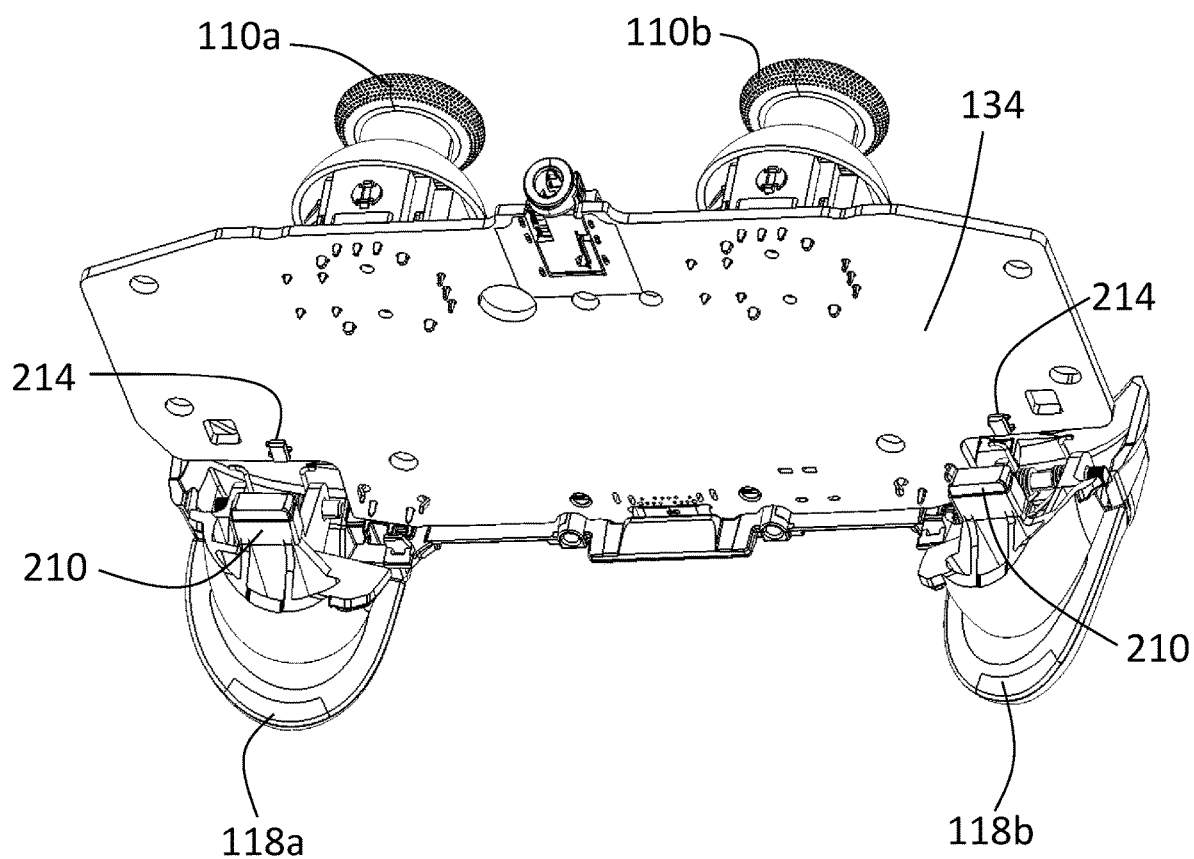
FIG. 14C is a bottom, rear perspective view of the main PCB of FIG. 14A.
Figure 15A:
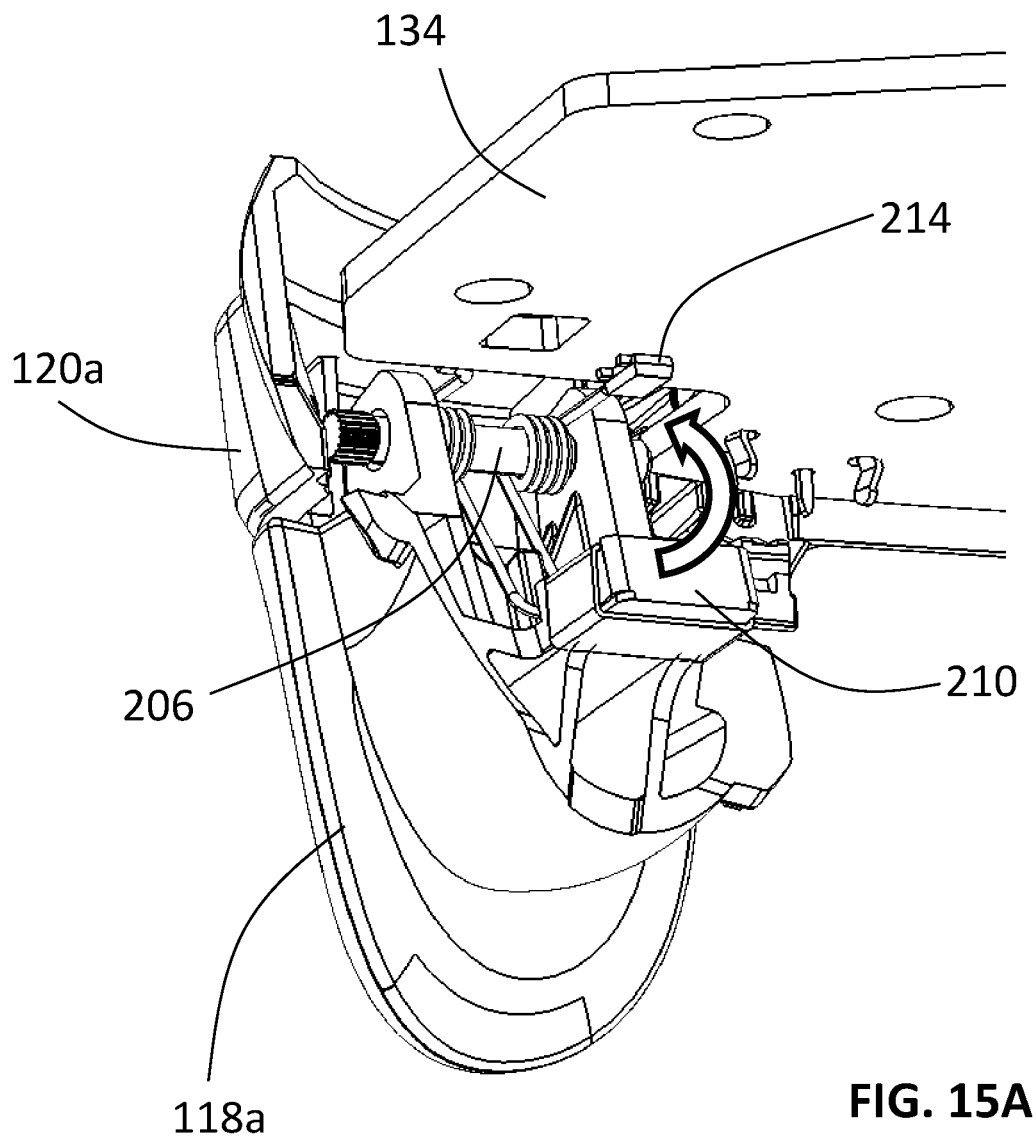
FIG. 15A is a partial enlarged bottom rear perspective view of the main PCB of FIG. 14A and left trigger.

In some implementations, each trigger 118a, 118b may include a magnet 212 which is configured to interact with a sensor that is configured to sense a position of magnet 212. Magnet 212 may be, for example, a rare earth magnet (e.g., neodymium magnet). Magnet 212 may be positioned within a housing 210 which rigidly extends from a rear of each trigger 118a, 118b. Housing 210 may define a chamber which is sized to receive magnet 212. Magnet 212 may be secured within the chamber, for example, using an adhesive or mechanical fastener. With particular reference to FIGS. 14C and 15A, in some implementations input device 100 includes sensors 214 which are configured to detect the relative position of magnets 212 as triggers 118a, 118b are pivoted during actuation. In some such implementations, sensors 214 include hall effect sensors which include a transducer that varies its output voltage in response to a magnetic field. In some implementations, sensors 214 may be positioned on a bottom portion of main PCB 134 and housing 210 containing magnets 212 of triggers 118a, 118b may extend below the sensors 214. As trigger 118a or 118b is actuated (e.g., by the user pressing on trigger 118a, 118b), housing 210 containing magnet 212 pivots toward sensor 214 reducing the distance between sensor 214 and magnet 212 and increasing the magnetic field detected by sensor 214. In some implementations, sensor 214 outputs different voltages (e.g., increasing voltages) with the increase in magnetic field which in turn can be converted to different signals by the one or more processors on main PCB 134. When the user's force on trigger 118a, 118b is released, spring 208 may return trigger 118a, 118 to its unactuated default position wherein the distance between sensor 214 and magnet 212 is at its largest extent.

Figure 14A:
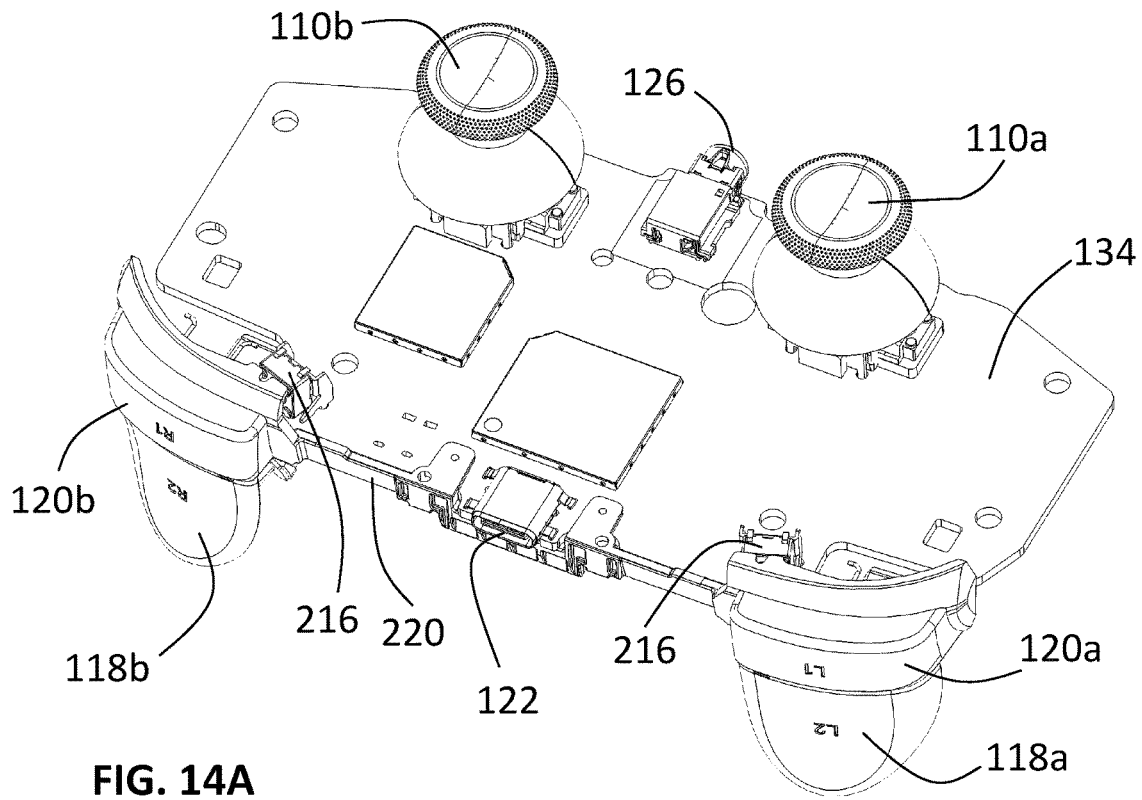
FIG. 14A is an isolated top, front perspective view of a main printed circuit board (PCB) of an input device shown with left and right triggers and bumper buttons with the mid-frame removed for clarity.
Figure 14B:
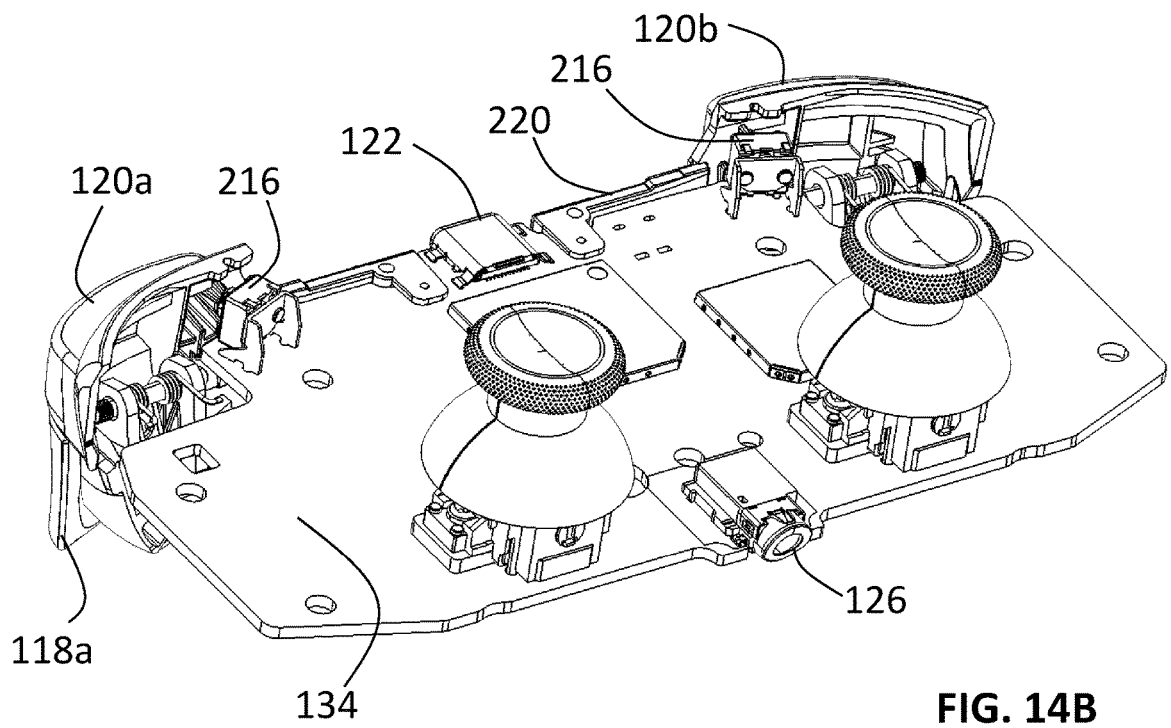
FIG. 14B is a top, rear perspective view of the main PCB of FIG. 14A.
Figure 15B:
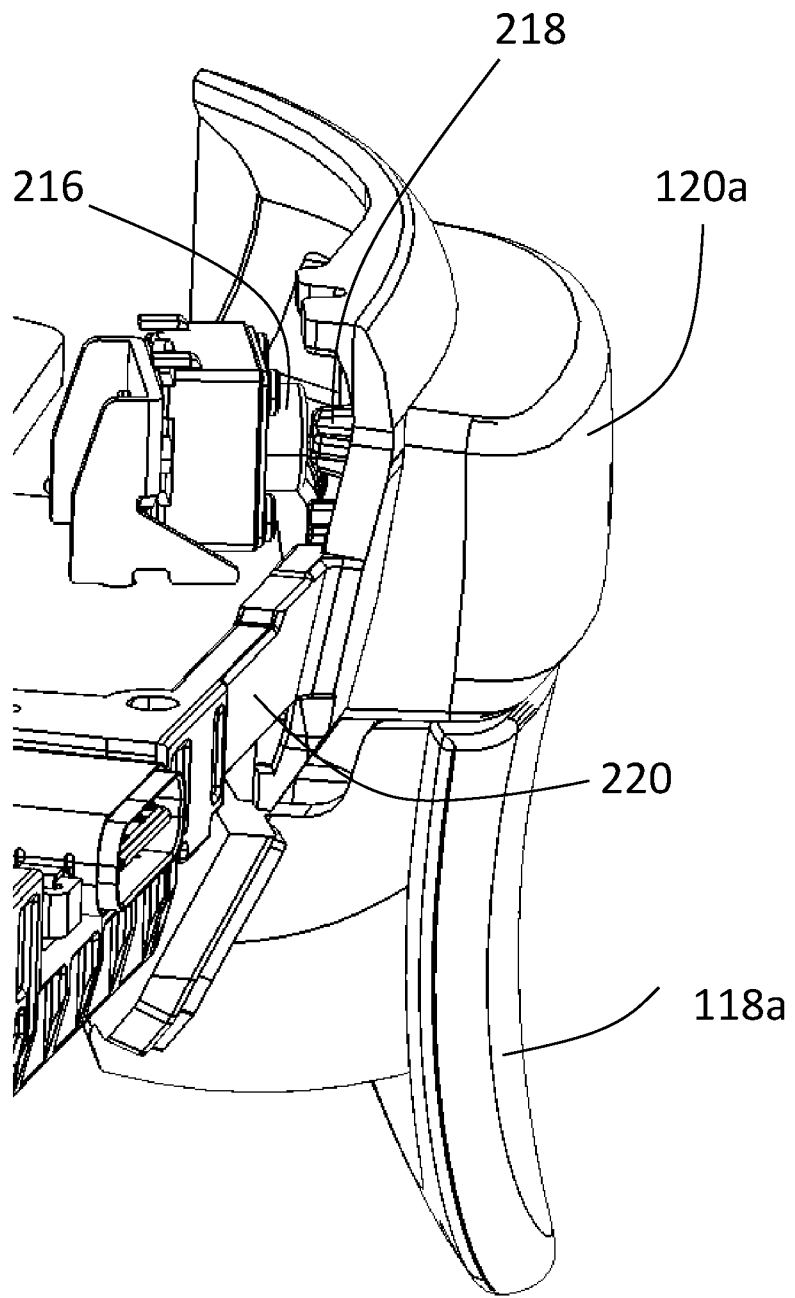
FIG. 15B is a partial enlarged top side perspective view of the left bumper button and switch mounted on the main PCB of FIG. 14A.

Referring now to FIGS. 14A, 14B, and 15B, each of left and right bumper buttons 120a, 120b in some implementations may be configured to contact a different switch 216 when actuated. Switches 216, when activated, may generate signals that are then processed by the one or more processors on main PCB 134. Each switch 216 may be or include a tactile switch or a snap-dome switch according to some implementations, and may be mounted on a top portion of main PCB 134. In some implementations, each of left and right bumper buttons 120a, 120b includes a contact 218 which extends from a rear portion of the left and right bumper buttons 120a, 120b. Each contact 218 may be positioned adjacent to a switch 216 such that when left or right bumper button 120a, 120b is actuated (e.g., pressed by the user), the contact 218 of the respective bumper button 120a, 120b presses against switch 216 to activate switch 216. In further implementations, each of left and right bumper button 120a, 120b includes a hard stop configured to limit the extent which the bumper button may be pressed.

In some implementations, left and right bumper button 120a, 120b are connected by a beam 220 which is positioned to extend along a front portion of main PCB 134 and/or mid-frame 132. In some implementations, beam 220 is bendable and includes one or more flexion points to provide a hinge motion for bumper buttons 120a, 120b. In some implementations, left and right bumper buttons 120a, 120b and beam 220 are formed as a single component which may reduce complexity of manufacture and help maintain the position of the component with input device 100.

Microphone Assembly

Figure 1F:
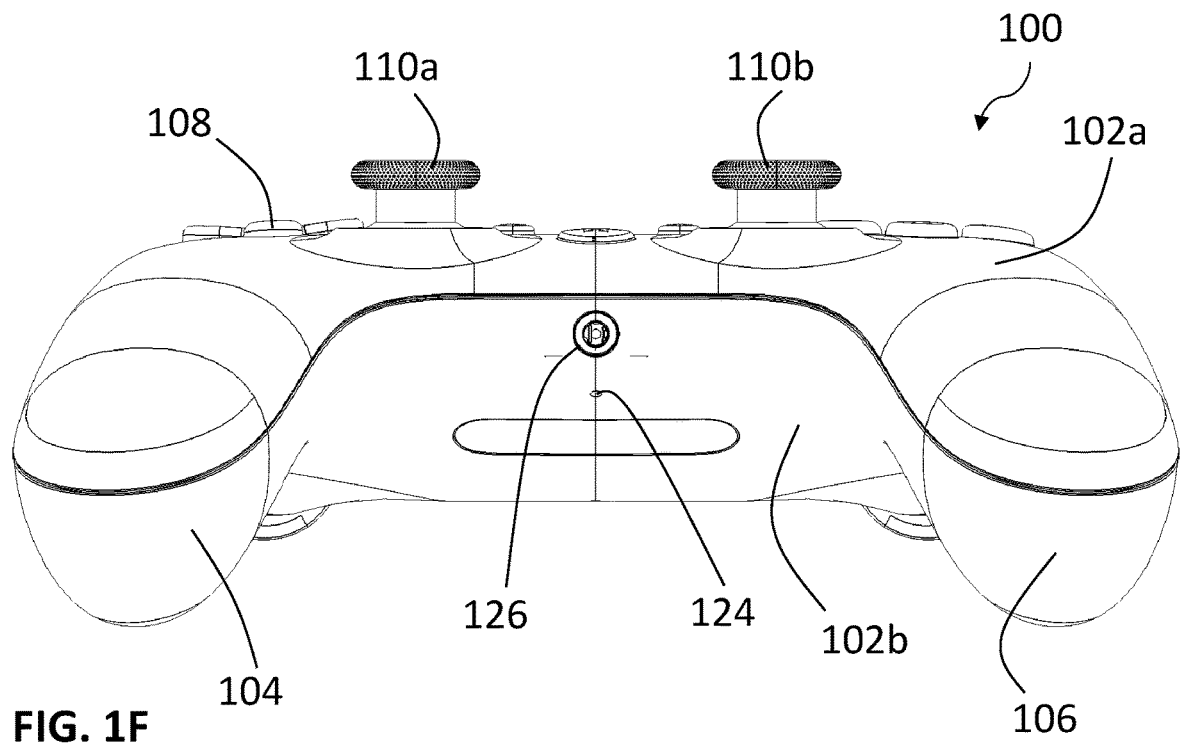
FIG. 1F is a rear elevation view of the input device of FIG. 1A.
Figure 1G:
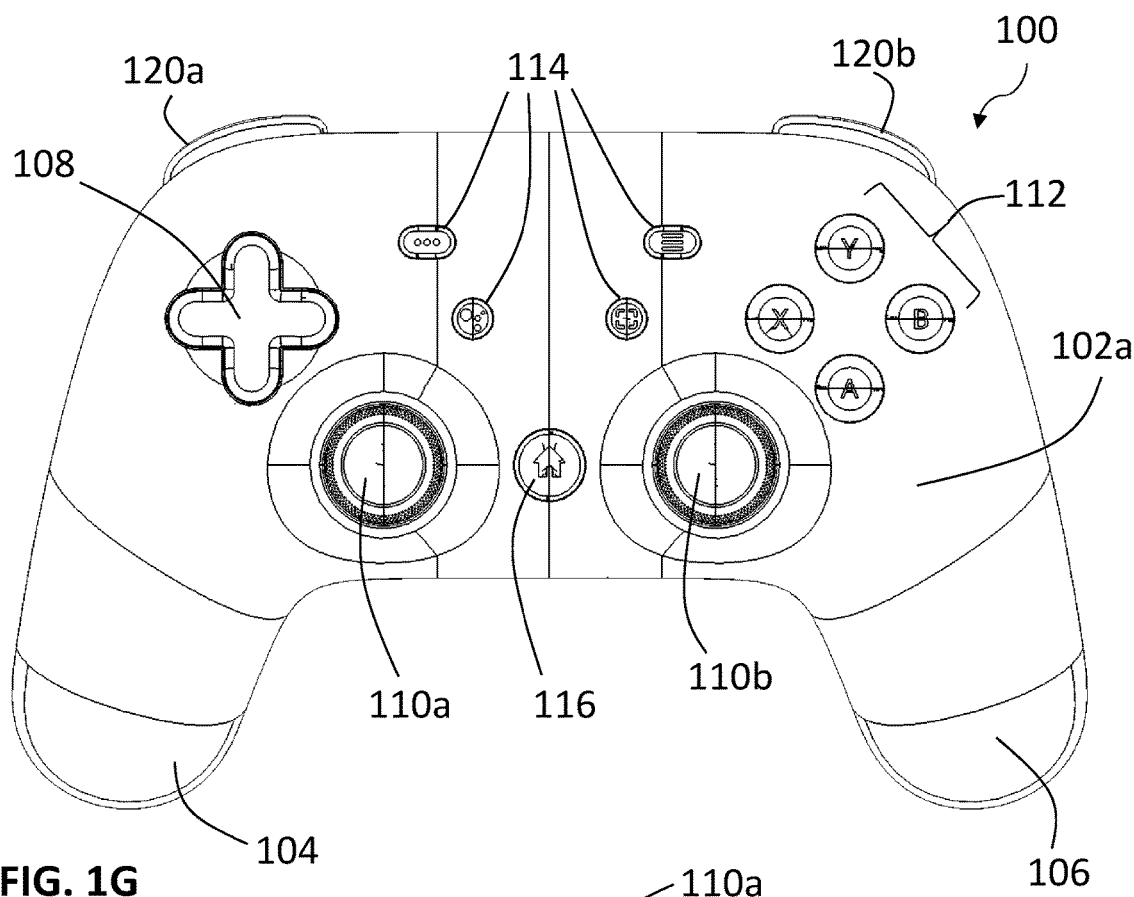
FIG. 1G is a top plan view of the input device of FIG. 1A.
Figure 1H:
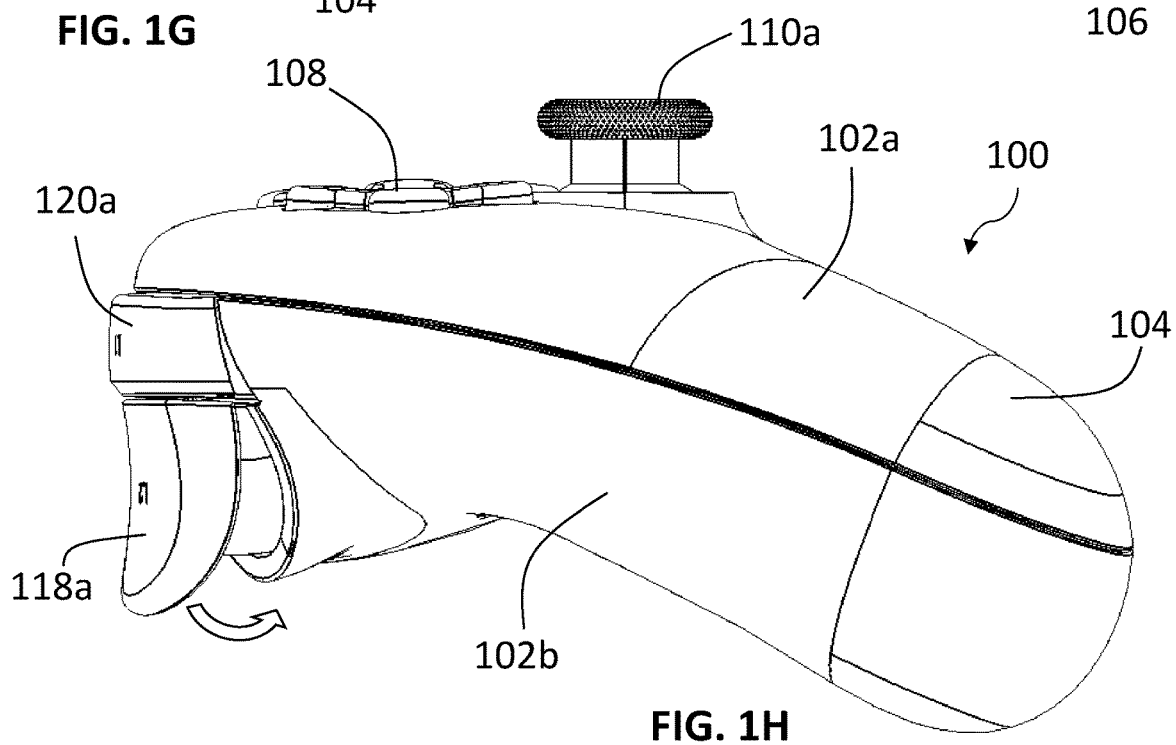
FIG. 1H is a left elevation view of the input device of FIG. 1A.

As discussed with regards to FIG. 1F, in some implementations input device 100 includes a microphone port 124 for receiving audio signals. Microphone port 124 may be positioned on a rear portion of input device 100, for example, between left grip 104 and right grip 106. In some implementations, bottom housing 102b includes a small circular opening to form microphone port 124. Audio signals received through microphone port 124 may be converted by an internal microphone assembly positioned within housing 102 of input device 100.

Figure 16:
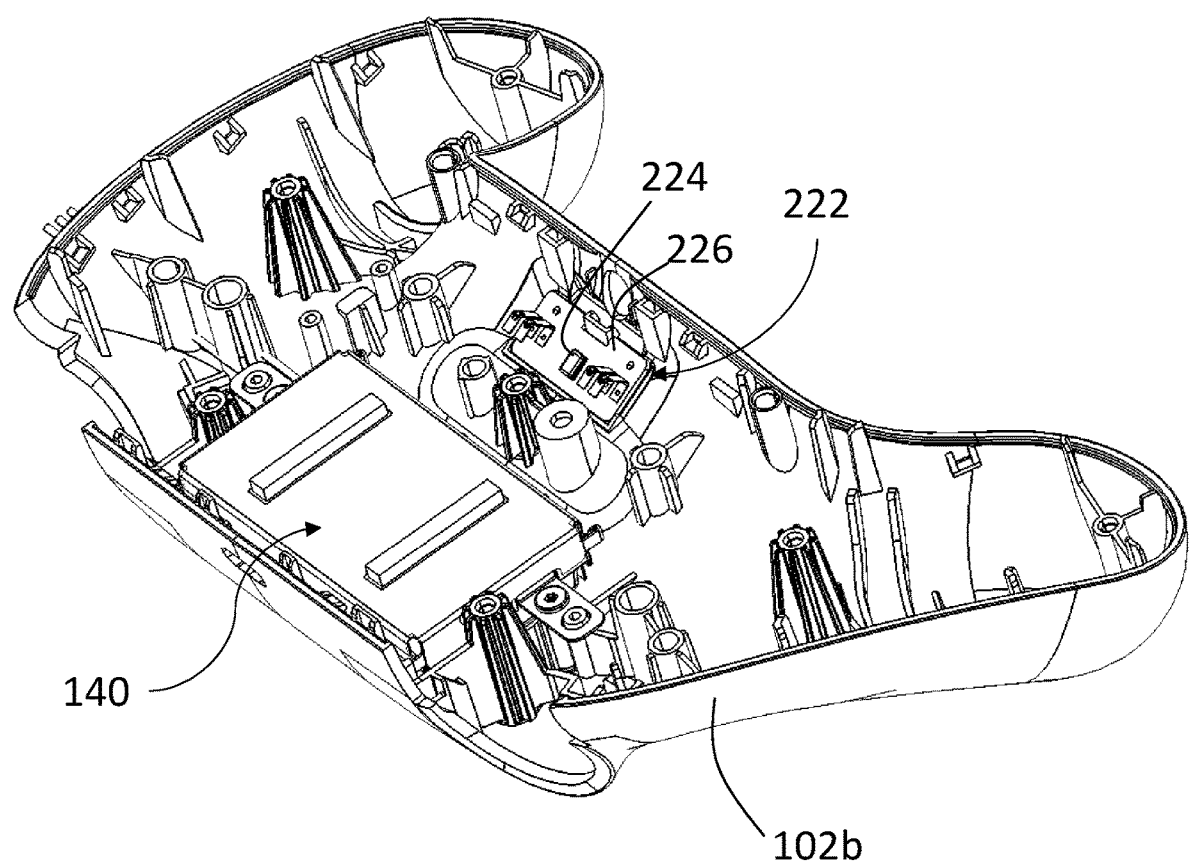
FIG. 16 is a top perspective view of the bottom housing of an input device showing the position of a microphone assembly according to some implementations of the present invention.
Figure 17A:
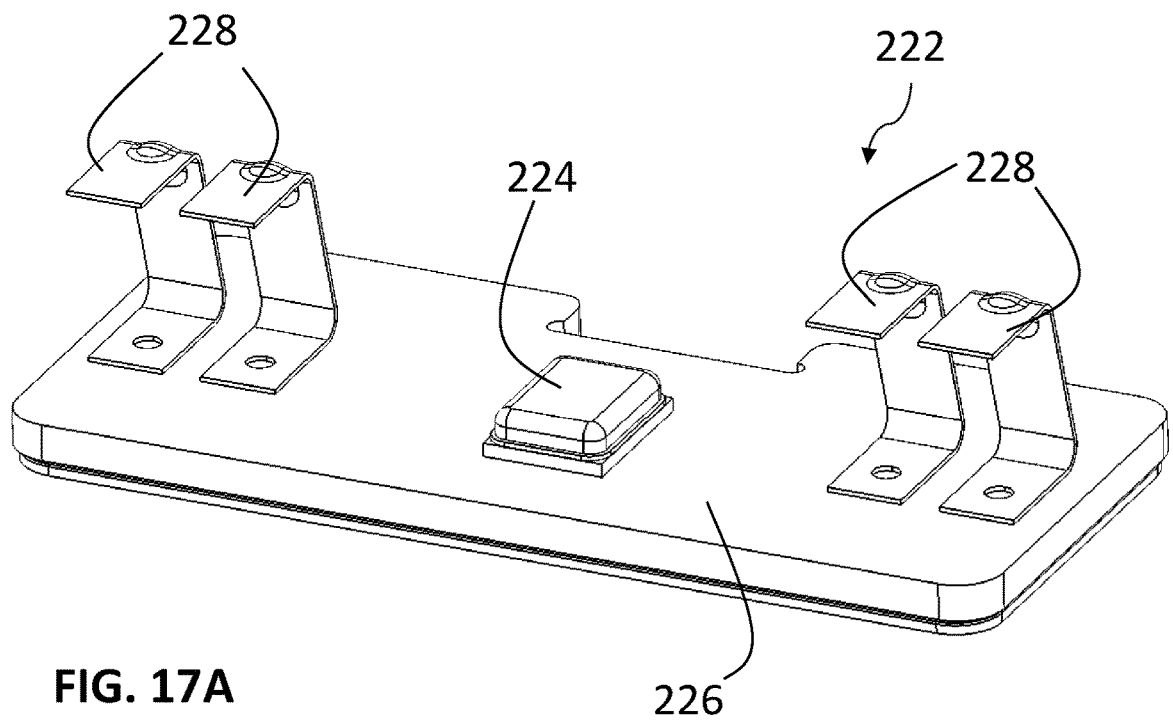
FIG. 17A is an isolated top perspective view of the microphone assembly of FIG. 16.
Figure 17B:
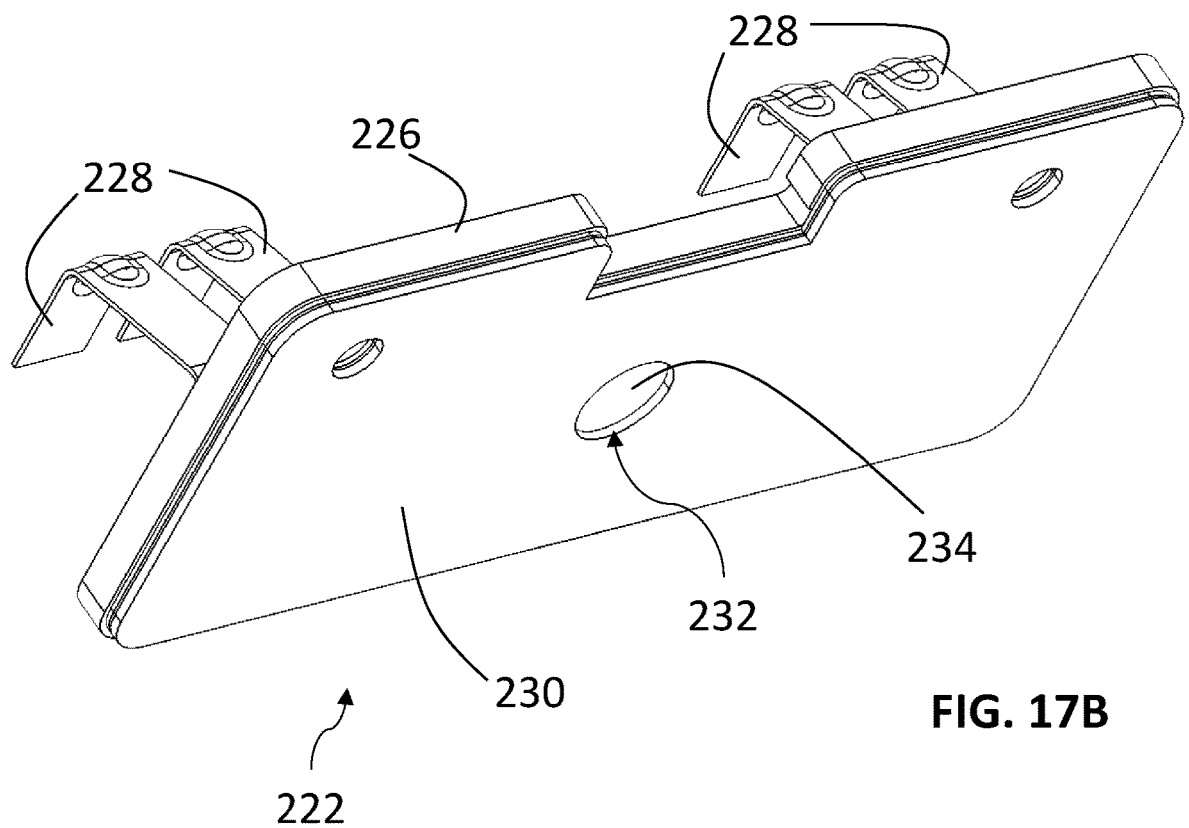
FIG. 17B is a bottom perspective view of the microphone assembly of FIG. 17A.
Figure 18:
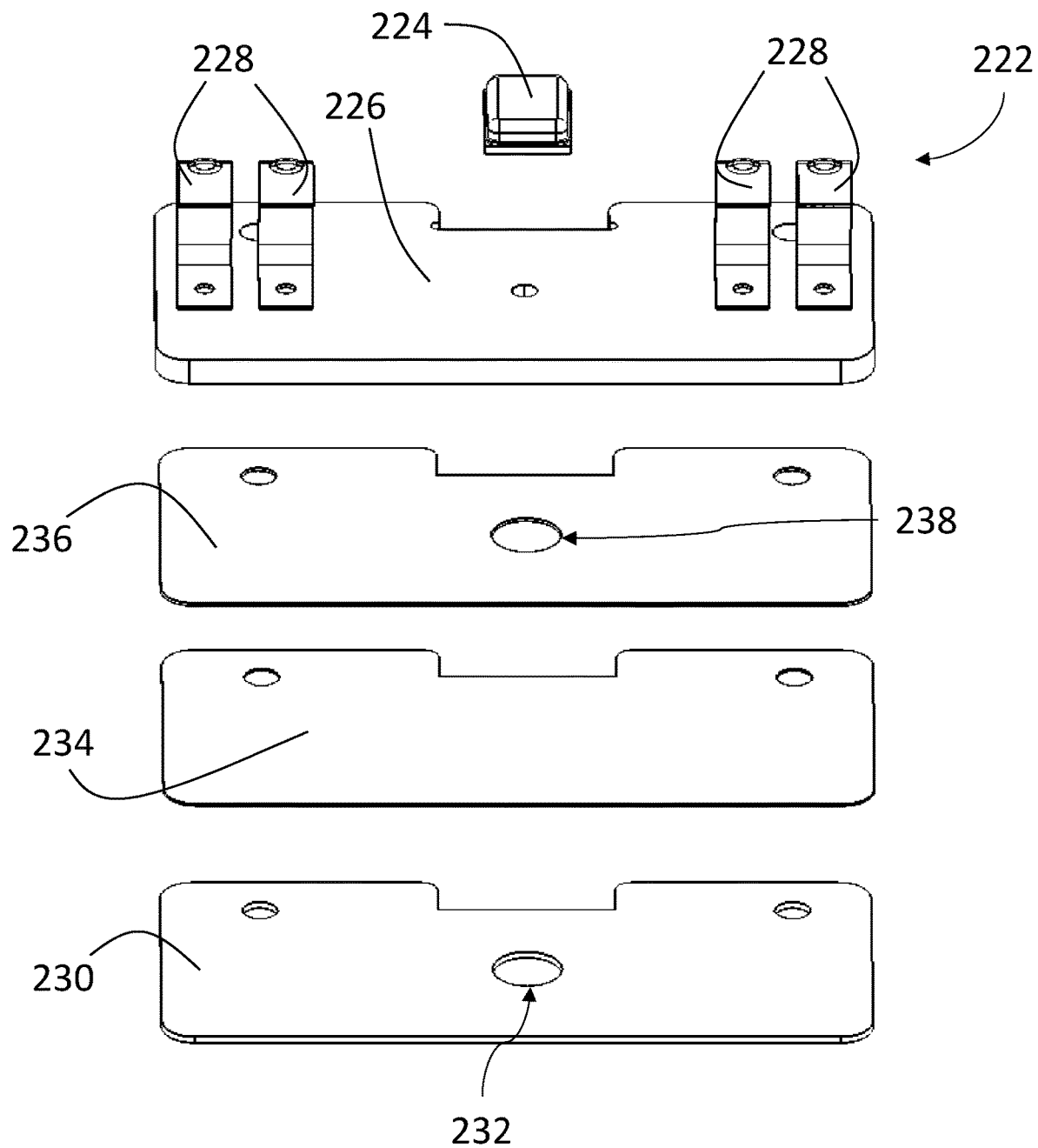
FIG. 18 is an exploded view of the microphone assembly of FIG. 17A.

FIG. 16 shows a perspective internal view of bottom housing 102b showing the relative location of microphone assembly 222 according to some implementations. In some implementations, microphone assembly 222 is positioned against an inside surface of bottom housing 102b at or proximate a rear portion of bottom housing 102b. In some such implementations, microphone assembly 222 may be positioned against an internal side of microphone port 124. Referring further to FIGS. 17A-18, in some implementations microphone assembly 222 includes a microphone 224 for receiving the audio signals through microphone port 124. In some implementations, microphone 224 includes a transducer that converts audio signals into an electrical signal. Microphone 224, in some implementations, is mounted on and electrically connected to a printed circuit board (PCB) 226, which in turn may be electrically connected to main PCB 134 via one or more electrical spring contacts 228 which may be elastic. In some implementations, spring contacts 228 contact a bottom portion of main PCB 134. In some implementations, spring contacts 228 are further configured to bias PCB 226 against bottom housing 102b and assist with keeping microphone assembly 222 in place within input device 100. In further implementations, microphone assembly 222 includes a bottom adhesive layer 230 which may be configured to adhere microphone assembly 222 to bottom housing 102b. In some implementations, bottom adhesive layer 230 includes an opening 232 which is positioned to align with microphone port 124 to allow sound to transmit therethrough. In some implementations, microphone assembly further includes a mesh layer 234 disposed between PCB 226 and bottom housing 102b. Mesh layer 223 may be positioned between PCB 226 and bottom adhesive layer 230. In some implementations, an intermediate adhesive layer 236 may be disposed between mesh layer 223 and PCB 226 and be configured to adhere mesh layer 223 to a bottom surface of PCB 226. Intermediate adhesive layer 236 may include an opening 238 positioned to align with opening 232 of bottom adhesive layer 230 and microphone port 124 in order to allow sound to transmit therethrough.

Button Construction

Figure 19:
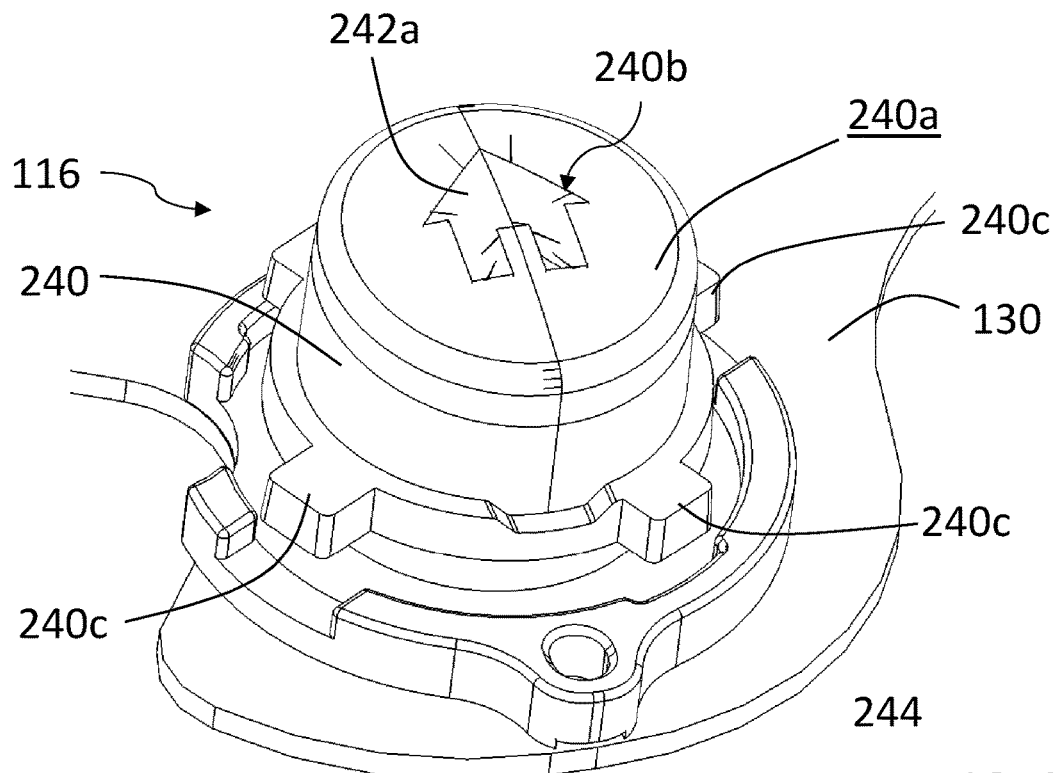
FIG. 19 is an enlarged top perspective view of a home button in accordance with some implementations of the present invention.
Figure 20:
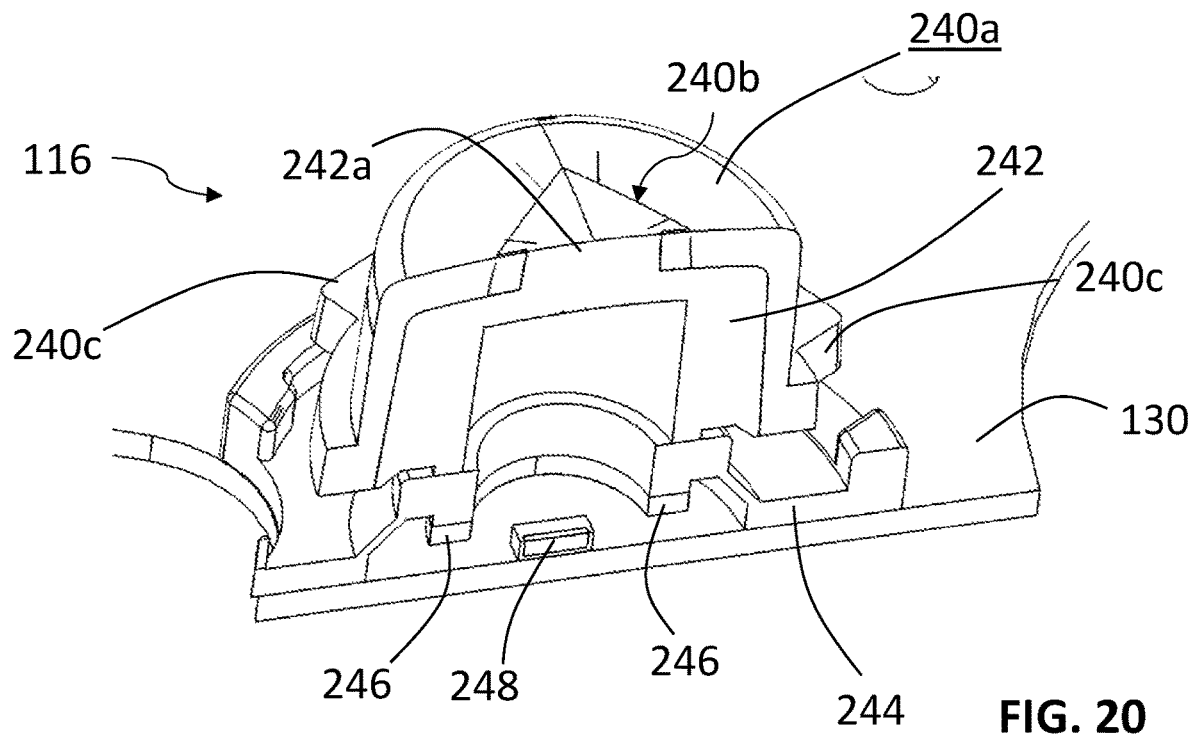
FIG. 20 is a cross-sectional view of the home button of FIG. 19.
Figure 21:
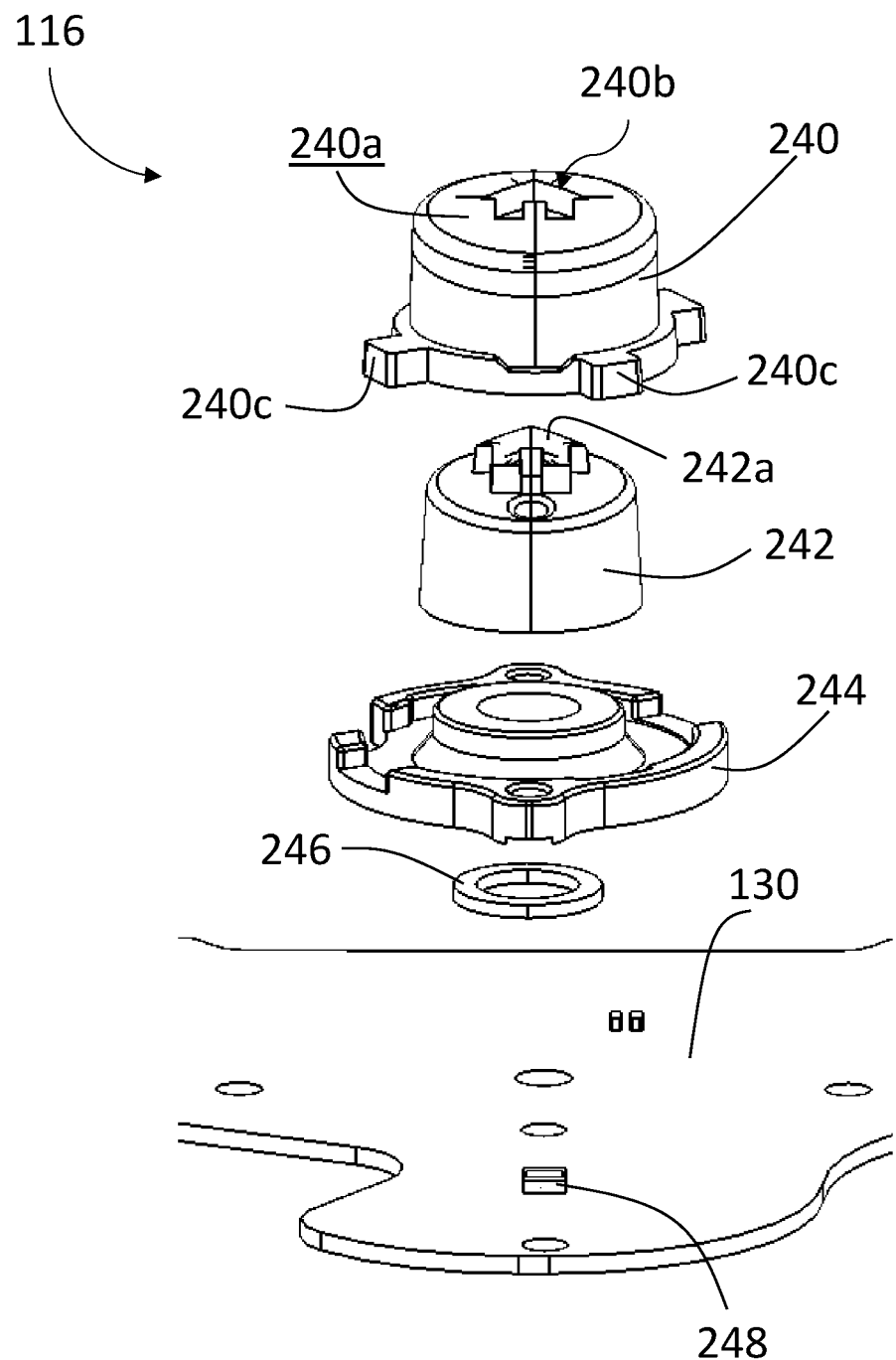
FIG. 21 is an exploded view of the home button of FIG. 19.

FIGS. 19-21 illustrate further details regarding the construction of home button 116 according to some implementations of the present invention. As shown in FIGS. 19-21, home button 116 in some implementations includes a button cap 240 which forms an external surface of home button 116 configured to extend at least partially through top housing 102a and be pressed by the user to actuate home button 116. Button cap 240 may be made from a rigid plastic material, for example. In some implementations, button cap 240 has a top surface 240a having an opening 240b in the shape of a predetermined logo, symbol, icon, or character. In the illustrated example, opening 240b is in the shape of a "home" symbol, though it should be appreciated that other shapes and designs are possible. Furthermore, while button cap 240 is illustrated as being generally cylindrical or conical in shape, button cap 240 is not necessarily limited to these particular shapes. In some implementations, button cap 240 includes one or more keyed features 240c such that button cap 240 may be positioned and oriented with respect to top housing 102a in a predetermined manner to ensure a proper positioning and alignment of home button 116. Keyed features 240c may, for example, include one or more radial projections which extend outwardly from a base portion of button cap 240.

In some implementations, home button 116 includes a light pipe 242 housed within button cap 240, and which may be constructed from a different material and/or have a different color than button cap 240. In some implementations, light pipe 242 may be shaped to line an internal surface of button cap 240. In some implementations, light pipe 242 may be made from a material configured to transmit visible light, whereas button cap 240 may be made from an opaquer material. In some implementations, light pipe 242 is configured to transmit at least a portion of light from a light source 248 (e.g., LED) positioned below or within home button 116 to opening 240b of button cap 240. In some implementations, light pipe 242 may be made from a transparent or translucent plastic material, for example, acrylonitrile butadiene styrene (ABS). In some implementations, light pipe 242 may include a light scattering material or light scattering texture in at least a portion of light pipe 242. In some implementations, light pipe 242 includes a top portion 242a which is shaped and sized to fit within opening 240b of button cap 240. In some implementations, top portion 242a may be shaped and sized to match and completely fill opening 240b and be flush with top surface 240a. Top portion 242a may include a light scattering material or have a light scattering texture such that top portion 242a appears illuminated or glowing when light source 248 is emitting light. As shown in the illustrated example, top portion 242a is in the shape of a "home" symbol which is configured to match and fit within the "home" symbol opening 240b of button cap 240. In some implementations, for example, light pipe 242 and button cap 240 may be formed together by double injection or double-shot molding such that the two layers of plastic are molded into each other. In other implementations, light pipe 242 and button cap 240 may be separate formed and fitted together.

In some implementations, home button 116 may further include a deformable web 244 upon which button cap 240 and/or light pipe 242 may be mounted. Web 244, in some implementations, is made from an elastic and/or resilient material, for example, silicone, and is disposed between light pipe 242 and PCB 130. In some implementations, web 244 is configured to bias light pipe 242 and button cap 240 away from PCB 130. When a user presses upon home button 116 according to some implementations, the user's force against button cap 240 may overcome the biasing force of web 244 such that web 244 deforms to allow button contact 246 of home button 116 to contact PCB 130 and complete a circuit to generate a signal. Button contact 246 may be, for example, a carbon pill which acts as a switch contact and be secured to a bottom of web 244 and/or light pipe 242. In some implementations, button contact 246 and web 244 may be annular or ring shaped to allow light from light source 248 to pass through. While the discussion of FIGS. 19-21 has focused particularly on home button 116, it should be appreciated that action buttons 112 and/or function buttons 114 may have similar constructions according to some implementations. In certain other implementations, action buttons 112 and/or function buttons 114 may not be illuminated and therefore need not include a light pipe component or an opening in their button caps.

Further Components and Modules

Figure 22:
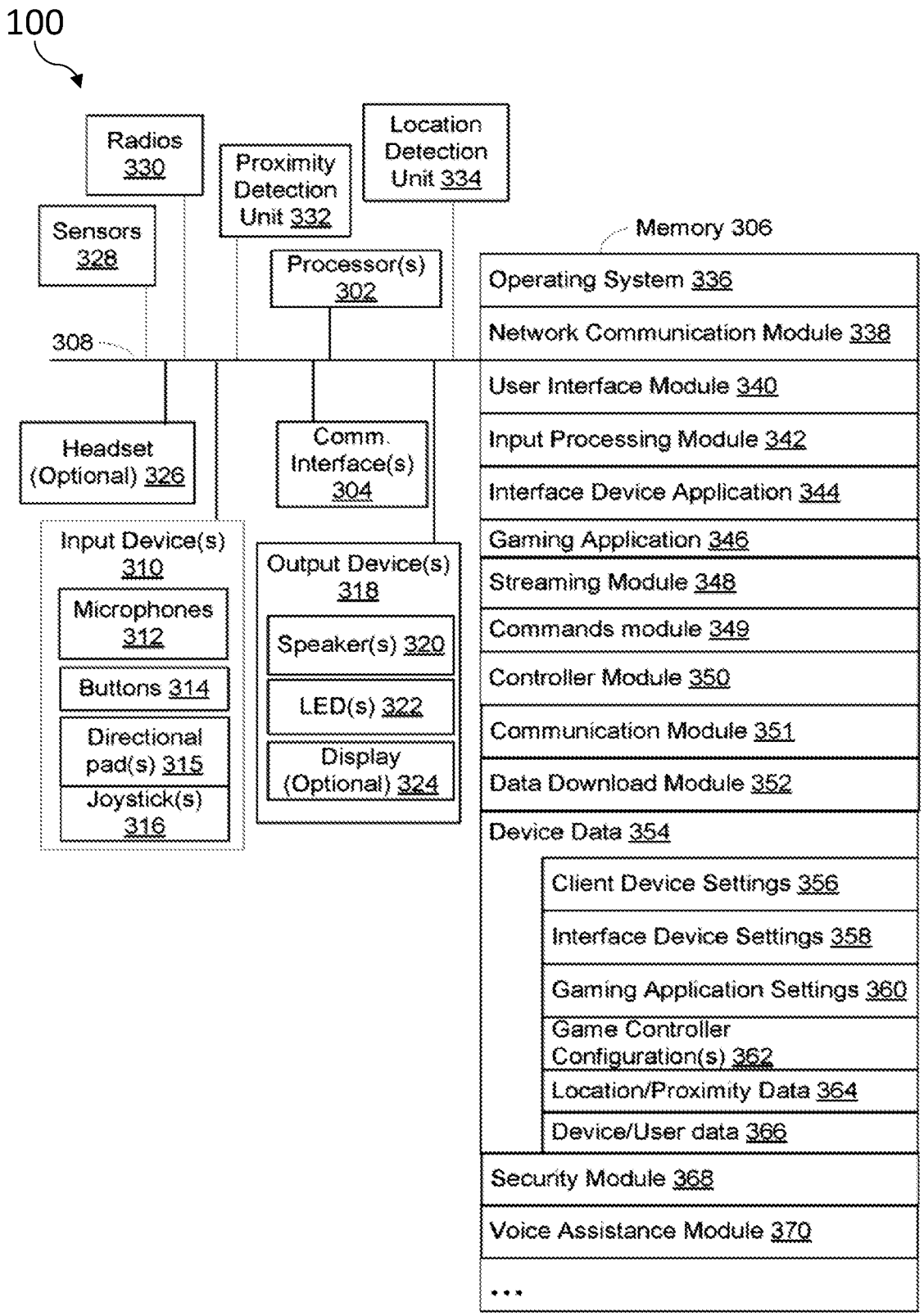
FIG. 22 is a block diagram illustrating further components and modules of an input device according to some implementations of the present invention.

FIG. 22 is a block diagram illustrating showing further components and modules that may be present in input device 100 in accordance with some implementations. Such components and modules may be included, for example, where input device 100 is configured as a game controller. Input device 100, in some implementations, includes one or more processor(s) (CPUs) 302, one or more communication interface(s) 304, memory 306, and one or more communication buses 308 for interconnecting these components (sometimes called a chipset). One or more of such components may be included on PCB 130 to main PCB 134 in some implementations. Input device 100, as discussed previously, may include one or more input controls 310 that facilitate user input, such as microphones 312 (e.g., microphone assembly 222) or other voice-command input unit, buttons 314 (e.g., action buttons 112, function buttons 114, home button 116, triggers 118a, 118b, bumper buttons 120a, 120b), one or more directional pad(s) 315 (e.g., directional control pad assembly 108), and/or joystick(s) 316 (e.g., control sticks 110a, 110b). In some implementations the input device 100 further includes gesture recognition features.

In some implementations, input device 100 may include one or more output device(s) 318 that facilitate audio output and/or visual output, including speaker(s) 320, LED(s) 322, and/or optionally, a display 324. The input device 100, in some implementations, includes a location detection unit 334, for example, a GPS (global positioning satellite) or other geo-location receiver, for determining the location of the input device 100. The input device 100 may further include a proximity detection unit 332, e.g., an IR sensor, for determining a proximity of an interface device and/or of other input devices 100 and/or electronic devices. The input device 100 may also include one or more sensor(s) 328 (e.g., accelerometer, gyroscope, etc.) for sensing motion, orientation, and other parameters of the input device 100, which may be used as input. In some implementations, input device 100 includes an optional headset 326 which plays back audio messages and/or gaming audio streams.

In some implementations, the input device 100 includes radios 330 that enable one or more communication networks and allow the input device 100 to communicate with other devices (e.g., with an interface device). In some implementations, the radios 330 are capable of data communications using any of a variety of custom or standard wireless protocols (e.g., IEEE 802.15.4, Wifi, ZigBee, 6LoWPAN, Thread, Z-Wave, Bluetooth Smart, ISA100.5A, WirelessHART, MiWi Whispernet, Bluetooth low energy etc.), custom or standard wired protocols (e.g., Ethernet, HomePlug etc.), and/or other suitable communication protocol, including communication protocols not yet developed as of the filing date of this document.

The memory 306, in some implementations, includes high-speed random access memory, such as DRAM, SRAM, DDR RAM, or other random access solid state memory devices; and, optionally, includes non-volatile memory, such as one or more magnetic disk storage devices, one or more optical disk storage devices, one or more flash memory devices, or one or more other non-volatile solid state storage devices. The memory 306, optionally, includes one or more storage devices remotely located from one or more processing units 302. The memory 306, or alternatively the non-volatile memory within the memory 306, includes a non-transitory computer readable storage medium. In some implementations, the memory 306, or the non-transitory computer readable storage medium of the memory 306, stores the following programs, modules, and data structures, or a subset or superset thereof:

Operating system 336 including procedures for handling various basic system services and for performing hardware dependent tasks;

Network communication module 338 for connecting the input device 100 to other devices (e.g., a server system, an interface device, or other the electronic devices) via one or more communication interfaces 304 (wired or wireless) and local networks and/or one or more networks, such as the Internet, other wide area networks, local area networks, metropolitan area networks, and so on;

User interface module 340 for enabling presentation of information (e.g., audio and/or video content, and optionally a graphical user interface for presenting applications, widgets, text, etc.) at the input device 100 via one or more output devices 318 (e.g., speakers, LED(s) etc.);

Input processing module 342 for detecting one or more user inputs or interactions from one of the one or more input controls 310 and interpreting the detected input or interaction;

Interface device application 344 for interacting with an interface device, for example, logging into a user account associated with the interface device, controlling the interface device if associated with the user account, and editing and reviewing settings and data associated with the interface device;

Gaming application 346 for cloud gaming functions that is configured to implement modules for various modes;

Commands module 348 for transmitting messages (e.g., setup commands) between the input device 100 and an interface device in a menu mode; and Streaming module 349 for transmitting gameplay commands between the input device 100 and a server system (e.g., to a streaming server) in a gameplay mode;

Controller module 350 for providing a gameplay input interface to the gaming application 346;

Communication module 351 for receiving and/or transmitting messages and media streams between the input device 100 and an interface device, and between the input device 100 and a gaming server;

Data download module 352 for downloading data (e.g., user accounts, user credentials, updates to modules and applications and data in the memory 306) from a server system and/or relayed from an interface device and other content hosts and providers;

Device data 354 storing at least data associated with the gaming application 346 and other applications/modules, including:

Client device settings 356 for storing information associated with the input device 100 itself, including common device settings (e.g., service tier, device model, storage capacity, processing capabilities, communication capabilities, etc.);

Interface device settings 358 for storing information associated with user accounts of the interface device application 344, including one or more of account access information, and information for interface device settings (e.g., service tier, device model, storage capacity, processing capabilities, communication capabilities, etc.);

Gaming application settings 360 for storing configured menus and/or shortcuts for the user to interact with a gaming Portal UI module;

Game controller configuration(s) 362 for storing information associated with configurations of the controller module 350 for the gaming application 346; and Location/proximity data 364 including information associated with the presence, proximity or location of any of the input device 100, the interface device, other input devices 100 and/or other electronic devices; and Device/user data 366 for storing the game controller identification and client certificate, identifications and client certificates of respective paired interface devices, one or more local network credentials (e.g., Wifi credentials), and information associated with one or more users linked to the input device 100, including login information, user credentials, authentication information, and optionally, storing user preferences, gameplay history data, and information on other players;

Security module 368 for presenting one or more authentication options and receiving inputs to the authentication options when activated; and Voice assistance module 370 for processing audio inputs/commands received by the microphones 312.

In some implementations, the communication module 351 can be one or more of a radio transmission module, a communication bus, such as the one or more communication buses 308, and a wired connection.

In some implementations, the controller module 350 is a part (e.g., a sub-module) of the interface device application 334 or another application in the memory 306. In some other implementations, the controller module 350 is a part of the operating system 336. In some further implementations, the controller module 350 is a distinct module or application.

Each of the above identified elements may be stored in one or more of the previously mentioned memory devices, and corresponds to a set of instructions for performing a function described above. The above identified modules or programs (i.e., sets of instructions) need not be implemented as separate software programs, procedures, modules or data structures, and thus various subsets of these modules may be combined or otherwise re-arranged in various implementations. In some implementations, memory 306, optionally, stores a subset of the modules and data structures identified above. Furthermore, memory 306, optionally, stores additional modules and data structures not described above.

While certain implementations of the present invention discussed herein are illustrative of input devices that may be useful for video game controllers, the input devices and the components thereof described herein are not necessarily limited to this particular use. Input devices according to implementations of the present invention may also include, for example, remote controls for televisions, audio systems, robots, remotely operated vehicles, unmanned aerial vehicles, or other electronic systems. Furthermore, elements described herein, such as the battery assembly, directional control pad assembly, microphone assembly, triggers, buttons, etc. are not restricted to use in input devices, and such elements may be used in other devices, for example, switches, mobile phones, computers, cameras, audio equipment, or other electronic devices.

The terminology used in the description of the various described implementations herein is for the purpose of describing particular implementations only and is not intended to be limiting. As used in the description of the various described implementations and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

The foregoing description, for purpose of explanation, has been described with reference to specific implementations. However, the illustrative discussions above are not intended to be exhaustive or to limit the scope of the claims to the precise forms disclosed. Many modifications and variations are possible in view of the above teachings. The implementations were chosen in order to best explain the principles underlying the claims and their practical applications, to thereby enable others skilled in the art to best use the implementations with various modifications as are suited to the particular uses contemplated.

What is claimed is:

1. A video game control pad assembly comprising:
a bracket comprising a support having a bearing surface;
a button cap configured to pivot relative to the bracket, the button cap comprising a peripheral lip and a pivot member configured to abut against the bearing surface of the support; and
a return mechanism configured to bias the button cap towards the bracket, the return mechanism comprising a hub portion positioned at least partially between the button cap and the bracket, and at least a first spring having a fixed end connected to the hub portion and a free end that is configured to deflect relative to the fixed end, the free end being coupled to a first portion of the peripheral lip of the button cap.

2. The video game control pad assembly of claim 1, wherein the hub portion includes a major aperture, and wherein the support of the bracket is received through the major aperture.

3. The video game control pad assembly of claim 1, wherein the fixed end of the first spring is connected to the hub portion by a first arm extending outwardly from the hub portion.

4. The video game control pad assembly of claim 3, wherein the first spring includes a first spring body between the fixed end and the free end that extends along a first spring axis, and the first arm extends along a first arm axis, and wherein an angle between the first spring axis and the first arm axis is less than 90 degrees.

5. The video game control pad assembly of claim 4, wherein the hub portion includes a top surface, and wherein an angle between the first spring axis and a plane of the top surface is greater than 0 degrees when the free end of the first spring is coupled to the peripheral lip of the button cap.

6. The video game control pad assembly of claim 3, wherein the bracket includes a first arm support, and wherein at least a portion of the first arm is disposed between the first arm support and the button cap.

7. The video game control pad assembly of claim 1, further comprising a snap dome film, and wherein the bracket is positioned between the snap dome film and the return mechanism.

8. The video game control pad assembly of claim 7, wherein the button cap further comprises one or more contacts which extend toward the snap dome film, and wherein the one or more contacts are configured to push against the snap dome film when the button cap is pivoted with respect to the bracket.

9. The video game control pad assembly of claim 6, wherein the first arm includes a minor aperture, and wherein the first arm support includes a post received through the minor aperture of the first arm.

10. The video game control pad assembly of claim 8, wherein the one or more contacts extend below a bottom surface of the bracket.

11. The video game control pad assembly of claim 1, wherein the return mechanism comprises a second spring having a fixed end connected to the hub portion and a free end that is configured to deflect relative to the fixed end of the second spring, the free end of the second spring being coupled to a second portion of the peripheral lip of the button cap.

12. The video game control pad assembly of claim 11, wherein the return mechanism comprises a third spring having a fixed end connected to the hub portion and a free end that is configured to deflect relative to the fixed end of the third spring, the free end of the third spring being coupled to a third portion of the peripheral lip of the button cap.

13. The video game control pad assembly of claim 12, wherein the return mechanism comprises a fourth spring having a fixed end connected to the hub portion and a free end that is configured to deflect relative to the fixed end of the fourth spring, the free end of the fourth spring being coupled to a fourth portion of the peripheral lip of the button cap.

14. The video game control pad assembly of claim 13, wherein the button cap includes four lobes, and wherein each of the first portion, second portion, third portion, and fourth portion of the peripheral lip are located on a different lobe of the button cap.

15. An input device comprising the video game control pad assembly according to claim 1.

16. A battery assembly of a video game control pad, comprising:
   a battery pack containing one or more cells, the battery pack having a top surface and a bottom surface;
   a first foam layer coupled to the bottom surface of the battery pack;
   a battery bracket positioned over the top surface of the battery pack; and
   a first adhesive layer disposed between the top surface of the battery pack and the battery bracket.

17. The battery assembly of claim 16, wherein the first adhesive layer comprises a pressure sensitive adhesive.

18. The battery assembly of claim 16, wherein the first adhesive layer has at least one of: an area that is less than an area of the top surface of the battery pack,. and one or more windows.

19. The battery assembly of claim 16, further comprising a second foam layer positioned on an external surface of the battery bracket and comprising one or more foam strips.

20. The battery assembly of claim 19, further comprising an insulator disposed at least partially around the battery bracket.

21. The battery assembly of claim 20, wherein the insulator includes one or more cutouts that are sized and shaped to receive the foam strips of the second foam layer.

22. The battery assembly of claim 16, wherein the battery pack includes at least two cells.

23. The battery assembly of claim 22, further comprising a second adhesive layer disposed between the at least two cells.

24. The battery assembly of claim 23, wherein the battery pack includes a housing surrounding the at least two cells and at least one internal foam member disposed within the housing on or around at least one of the at least two cells.

25. An input device comprising the battery assembly according to claim 16.

* * * * *